United States Patent
Funakawa

(10) Patent No.: US 10,791,235 B2
(45) Date of Patent: Sep. 29, 2020

(54) PROCESSING APPARATUS PERFORMING CONTROL OF POWER SUPPLY DURING AN INSPECTION PROCESS OF A DEVICE PROVIDED TO THE PROCESSING APPARATUS

(71) Applicant: KONICA MINOLTA, INC., Chiyoda-ku, Tokyo (JP)

(72) Inventor: Hisataka Funakawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 2 days.

(21) Appl. No.: 16/036,700

(22) Filed: Jul. 16, 2018

(65) Prior Publication Data

US 2019/0037095 A1 Jan. 31, 2019

(30) Foreign Application Priority Data

Jul. 26, 2017 (JP) .................. 2017-144894

(51) Int. Cl.
| | |
|---|---|
| *H04N 1/00* | (2006.01) |
| *B41J 29/38* | (2006.01) |
| *G03G 21/14* | (2006.01) |
| *G03G 15/00* | (2006.01) |
| *G03G 15/20* | (2006.01) |

(52) U.S. Cl.
CPC .......... *H04N 1/00891* (2013.01); *B41J 29/38* (2013.01); *G03G 15/2039* (2013.01);
(Continued)

(58) Field of Classification Search
CPC ........... H04N 1/00885; H04N 1/00888; H04N 1/00891; H04N 1/00896; H04N 1/00901;
(Continued)

(56) References Cited

U.S. PATENT DOCUMENTS

2005/0030582 A1* 2/2005 Xu .................... H04N 1/00209
358/1.15
2007/0057937 A1 3/2007 Lee
(Continued)

FOREIGN PATENT DOCUMENTS

| CN | 1932961 A | 3/2007 |
|---|---|---|
| CN | 102572186 A | 7/2012 |

(Continued)

OTHER PUBLICATIONS

Chinese Office Action dated Jul. 29, 2019 (and English translation thereof) issued in Chinese Application No. 201810812571.3.

*Primary Examiner* — Kent Yip
(74) *Attorney, Agent, or Firm* — Holtz, Holtz & Volek PC

(57) ABSTRACT

A processing apparatus to which an option is mountable, the processing apparatus including: a power supply unit; a device that (i) is controlled by the option mounted to the processing apparatus or controls the option and that (ii) performs a process corresponding to an inspection of whether or not the device operates normally; and a switching unit that switches on and off supply of electric power from the power supply unit to the device. Here, while the switching unit is receiving an instruction to initiate the process, the switching unit switches on the supply of electric power from the power supply unit to the device, while the switching unit is not receiving the instruction, the switching unit switches off the supply of electric power from the power supply unit to the device, and the device performs the process upon receiving electric power supplied from the power supply unit by the switching unit.

20 Claims, 20 Drawing Sheets

<When option is mounted>

(52) U.S. Cl.
CPC ......... *G03G 15/5004* (2013.01); *G03G 21/14* (2013.01); *H04N 1/00233* (2013.01); *H04N 1/00244* (2013.01); *G03G 15/502* (2013.01)

(58) Field of Classification Search
CPC ........... H04N 1/00904; H04N 1/00344; H04N 1/00538; H04N 1/00541; H04N 1/00559; H04N 1/2158; H04N 2201/0091; H04N 2201/0094; H04N 1/00244; G06F 3/1221
See application file for complete search history.

(56) References Cited

U.S. PATENT DOCUMENTS

| | | |
|---|---|---|
| 2012/0154859 A1 | 6/2012 | Goda |
| 2015/0003850 A1* | 1/2015 | Umimura ............... G03G 15/80 399/37 |
| 2015/0055158 A1 | 2/2015 | Ogata et al. |
| 2015/0153808 A1 | 6/2015 | Nakai |
| 2015/0215484 A1* | 7/2015 | Senba ................ H04N 1/00496 358/1.13 |
| 2016/0011558 A1 | 1/2016 | Choho |
| 2018/0013909 A1* | 1/2018 | Yoshida ............. H04N 1/00891 |

FOREIGN PATENT DOCUMENTS

| | | |
|---|---|---|
| CN | 104427158 A | 3/2015 |
| CN | 104683637 A | 6/2015 |
| CN | 105262921 A | 1/2016 |
| JP | 2009271413 A | 11/2009 |
| JP | 2012058628 A | 3/2012 |
| JP | 2012226048 A | 11/2012 |

* cited by examiner

<When option is not mounted>

<When option is mounted>

FIG. 8

|  | State 1 | State 2 | State 3 | State 4 |
|---|---|---|---|---|
| MFP power supply | Off | On | | |
| MFP operation | Not operating | Normal mode | Inspection mode | Normal mode |
| Server | Not mounted | Not mounted | Not mounted | Not mounted |
| Supply of electric power to LED unit | No | No | Yes | No |

FIG. 9

|  | State 11 | State 12 | State 13 | State 14 |
|---|---|---|---|---|
| MFP power supply | Off | On | | |
| MFP operation | Not operating | Normal mode | Normal mode | Normal mode |
| Server | Not mounted | Mounted | Mounted | Mounted |
| Server power supply | Off | Off | On | Off |
| Supply of electric power to LED unit | No | No | Yes | No |

FIG. 14

| MFP operation | Starting up (warming up) | Standing by | Printing | Standing by | Power-saving | Restoring | Standing by |
|---|---|---|---|---|---|---|---|
| MFP electric power consumption | Large | Medium | Large | Medium | Small | Large | Medium |
| Restriction of electric power supplied to LED unit | Yes | No | Yes | No | Yes | Yes | No |

FIG. 20

Table 211

| MFP | MFP electric power consumption P(W) |
|---|---|
| Standing by | P1 |
| Printing | P2 (> P1) |

PROCESSING APPARATUS PERFORMING CONTROL OF POWER SUPPLY DURING AN INSPECTION PROCESS OF A DEVICE PROVIDED TO THE PROCESSING APPARATUS

This application claims priority to Japanese Patent Application No. 2017-144894 filed Jul. 26, 2017, the contents of which are hereby incorporated herein by reference in their entirety.

BACKGROUND

Technical Field

The present disclosure relates to a processing apparatus such as an image forming device or the like to which a device that is an option is mountable.

Description of the Related Art

In some image forming devices such as printers, devices that are options are mountable (see JP2012-226048). Examples of such options are, for example, information technology devices (IT devices) such as servers that perform network communication and data management. Such an IT device as an option typically is not mounted to an image forming device when the image forming device is shipped from a factory manufacturing the image forming device, and is fitted to the image forming device according to a user's wishes when or after the image forming device is installed into the user's office or the like.

By configuring an IT system in which an IT device is interposed between a network and the image forming device, communication with external terminal devices through the network, management of various data, and the like is performed more efficiently than in a configuration including only the image forming device.

A configuration is envisaged in which the IT system described above includes, for example, not only the server but also a device such as an LED display controlled by the server. In such a configuration, a current operation status of the server can be displayed on the LED display such as a progress state of uploading in a case in which image data for a job that the image forming device performs is uploaded to a cloud service from the server through the network. By looking at the LED display, the user can easily recognize to what extent the uploading has progressed.

As described above, the option is fitted to the image forming device according to the user's wishes. Accordingly, the option is typically mounted to the image forming device in the user's office or the like where the image forming device is installed.

In a structure in which the option includes a server and an LED display, the server can be mounted to the image forming device relatively easily if the image forming device has a space for storing the server in a housing in which a main body of the image forming device is stored. However, installation of the LED display is likely to be troublesome compared to installation of the server. It is desirable that the LED display is disposed at the front of the image forming device in order to improve visibility for the user. However, an external cover is placed at the front of the image forming device when the image forming device is shipped from the manufacturing factory. Accordingly, if an LED display is to be additionally mounted to the image forming device, a process is required of, for example, removing the external cover and embedding the LED display into a space from which the external cover is removed.

It is desirable that installation of the option, which is performed in the user's office or the like, is completed easily within a short period of time. One possible procedure for achieving this is to incorporate the LED display into the image forming device before shipping from the manufacturing factory.

However, the LED display is a device connected to a server. Accordingly, even if a process of incorporating the LED display into the image forming device is added in the manufacturing factory, the LED display cannot operate in a state in which a server is not connected to the image forming device.

Before shipping from the manufacturing factory, inspection of whether or not components in the image forming device such as a printing unit and an authentication unit operates normally, i.e. has no abnormality, needs to be performed. If the LED display is incorporated into the image forming device in advance in the manufacturing factory, such a structure would necessitate a troublesome procedure of preparing a server, which is the option, along an inspection line in the manufacturing factory independently from the image forming device and connecting the server to the image forming device along the inspection line in order to inspect the LED display before shipping from the manufacturing factory.

In contrast, inspection of the LED display can be performed without having to prepare a server in a structure in which, for example, electric power is always supplied to the LED display from a power supply unit of the image forming device that supplies electric power to components such as the printing unit, and operations of the LED display can be checked with use of the electric power supplied from the power supply unit of the image forming device.

However, if a server is not mounted to the image forming device after the image forming device is shipped from the manufacturing factory and installed into the user's office or the like, electric power continues to be always supplied from the power supply unit of the image forming device to the LED display that does not operate. This wastes standby electric power consumed by the LED display.

The problem as described above is not limited to the combination of an image forming device and IT devices including a server and an LED display, and may occur in any structure including a combination of a processing apparatus such as an image forming device, an option that is fitted to the processing apparatus, and a device that controls or is controlled by the option.

SUMMARY

The present disclosure aims to provide a processing apparatus in which, in a structure in which a device such as an LED display is incorporated in advance into the processing apparatus, inspection of whether or not the device operates normally is performed easily while preventing wasteful electric power consumption.

A processing apparatus reflecting at least one aspect of the present disclosure is a processing apparatus to which an option is mountable, the processing apparatus including: a power supply unit; a device that (i) is controlled by the option mounted to the processing apparatus or controls the option and that (ii) performs a process corresponding to an inspection of whether or not the device operates normally; and a switching unit that switches on and off supply of electric power from the power supply unit to the device. In the processing apparatus, while the switching unit is receiving an instruction to initiate the process, the switching unit switches on the supply of electric power from the power supply unit to the device, while the switching unit is not receiving the instruction, the switching unit switches off the supply of electric power from the power supply unit to the device, and the device performs the process upon receiving electric power supplied from the power supply unit by the switching unit.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention.

In the drawings:

FIG. 8 is a diagram of how supply and stoppage of electric power to the LED unit are switched in accordance with operation modes of the MFP;

FIG. 9 is a diagram of how supply and stoppage of electric power to the LED unit are switched in accordance with whether or not the server is connected;

FIG. 14 is a diagram of how whether or not supply of electric power to the LED unit is restricted is switched in accordance with operation states of the MFP;

FIG. 20 is a diagram of an example of a structure of a table in which the operation states of the MFP are associated with electric power consumed by the MFP.

DETAILED DESCRIPTION

Hereinafter, one or more embodiments of the present invention will be described with reference to the drawings. However, the scope of the invention is not limited to the disclosed embodiments.

The following describes examples in which embodiments of a processing apparatus pertaining to the present invention are applied to image forming devices, with reference to the drawings.

Embodiment 1

(1) Structure of Image Forming Device

Figure 1:
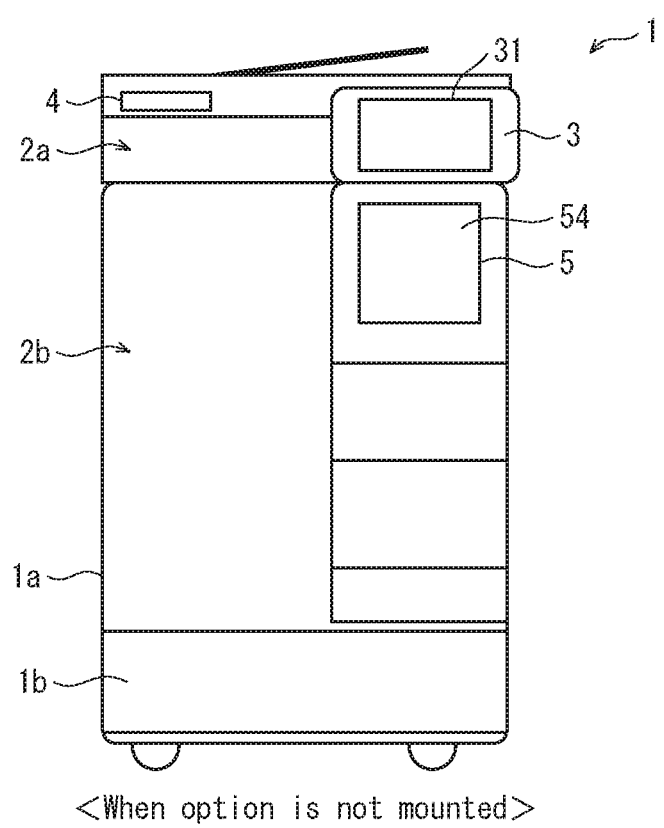
FIG. 1 is a schematic elevation view of a structure of a multi-function peripheral (MFP) that is an example of an image forming device pertaining to Embodiment 1.

FIG. 1 is a schematic elevation view of a structure of a multi-function peripheral 1 (hereinafter referred to as the MFP 1) that is an example of an image forming device.

In FIG. 1, the MFP 1 includes components such as a scanning unit 2*a*, a printing unit 2*b*, an operation display unit 3, an authentication unit 4, and an LED unit 5. In the following, the terms such as "upper", "lower", "below", and "above" are used relative to an upper-lower direction when the MFP 1 is viewed from a front of the MFP 1, and the terms "left" and "right" are used relative to a left-right direction when the MFP 1 is viewed from the front of the MFP 1.

The scanning unit 2*a* performs a scan job of: conveying a document that is set to the scanning unit 2*a* to a reading position; reading a document image by irradiating the document that is conveyed to the reading position by using light emitted from a lamp 2*c* (FIG. 4); and obtaining image data by converting light reflected by the document to electricity.

The printing unit 2*b* is disposed below the scanning unit 2*a*, and performs a copy job of printing an image on a sheet on the basis of the image data obtained by the reading performed by the scanning unit 2*a* and/or a print job of printing an image on a sheet on the basis of image data transmitted through a network from an external terminal device (not illustrated). The structure of the printing unit 2*b* is described later.

The operation display unit 3 is disposed at a position that is convenient for users to operate the MFP 1. Here, the operation display unit 3 is disposed at the front of the MFP 1 at a right end of the scanning unit 2*a*. The operation display unit 3 includes a touch panel 31 having a liquid crystal display (LCD).

The authentication unit 4 is disposed at the front of the MFP 1 at a left end of the scanning unit 2*a*. The authentication unit 4 receives an identification (ID) input from a user and authenticates the user if the user is allowed to use the MFP 1. If the user is authenticated, the user can use the MFP 1; if the user is not authenticated, the user cannot use the MFP 1. Note that the procedure for user authentication is not limited to input of an ID; for example, biometric authentication using a finger or the like may be used.

The LED unit 5 is a display device that includes an LED display portion 54, and the LED display portion 54 includes many LEDs that are arranged two-dimensionally. The LED unit 5 is disposed in a position that is easy for users to recognize by sight. Here, the LED unit 5 is disposed at the front of the MFP 1, just below the operation display unit 3.

Figure 2:
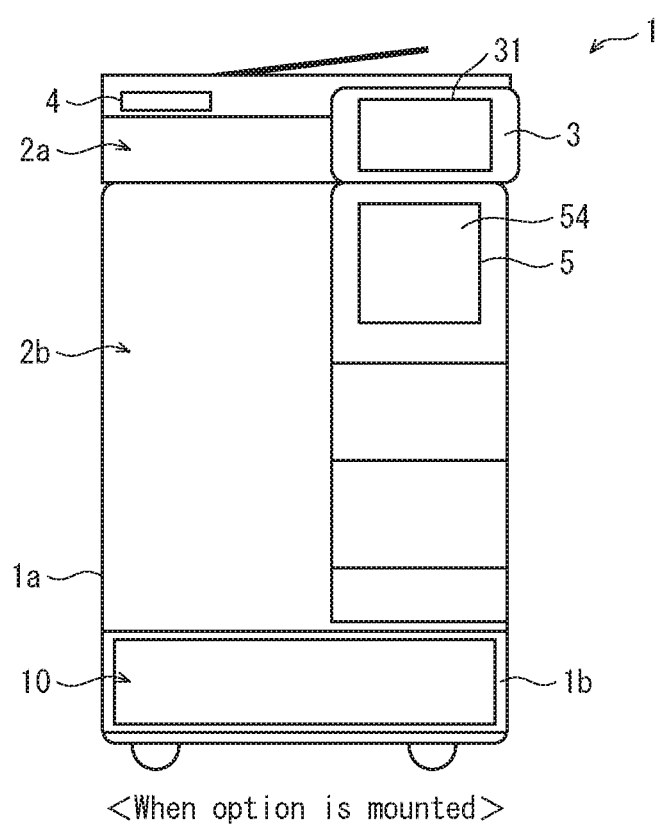
FIG. 2 is a diagram in which a server that is an option is mounted to the MFP.

The scanning unit 2a, the printing unit 2b, the operation display unit 3, the authentication unit 4, and the LED unit 5 are stored in a device housing 1a of the MFP 1. The device housing 1a further includes, below the printing unit 2b, a storage space 1b for storing an option that is mountable to the MFP 1. FIG. 1 illustrates a state in which no option is mounted to the MFP 1, and FIG. 2 illustrates a state in which an option 10 is mounted to the MFP 1.

Here, the option 10 is a server that can communicate with an external terminal device (such as a personal computer (PC) or another MFP) through a network such as a local area network (LAN).

The server 10 has the following functions:
(a) a function of storing image data transmitted from an external MFP through a network and/or image data read by the scanning unit 2a of the MFP 1;
(b) a function of providing the stored image data for a print job;
(c) a function of exchanging electronic mail (e-mail) with an external PC through a network; and
(d) a cloud function of performing a cloud service of uploading and downloading various files including image data by communicating with an external cloud computer through a network.

When performing the cloud function, the server 10 performs a display control of causing the LED unit 5 of the MFP 1 to display a state of progress of uploading or downloading of a file. Details of the display control are described later. The server 10 controls the LED unit 5, and therefore the LED unit 5 is a device controlled by the server 10, which is the option, although the LED unit 5 is a device incorporated into the MFP 1 as a part of the MFP 1 in the manufacturing factory of the MFP 1 before shipping.

The LED unit 5, which is controlled by the option, is also referred to as a device, and the scanning unit 2a, the printing unit 2b, and the authentication unit 4, which are not controlled by the option but by an overall control unit 6 (FIG. 4) of the MFP 1, are also referred to as second devices.

The server 10 is the option, and therefore is not mounted to the MFP 1 at the time point of shipping from the manufacturing factory of the MFP 1 but is fitted according to a user's wishes when or after the MFP 1 is installed into the user's office or the like.

However, a structure in which the server 10, and the LED unit 5, which is controlled by the server 10, are fitted to the MFP 1 later would require removing of an external cover at the front of the MFP 1 and mounting the LED unit 5 in the user's office when fitting the server 10 as described under "Technical Field" above, which may require time for installation and may be troublesome.

In view of this, the present embodiment adopts a structure in which the LED unit 5 is incorporated into the MFP 1 before shipping from the manufacturing factory, in order to facilitate the installation processes that are performed when the server 10, which is the option, is fitted after the MFP 1 is shipped from the manufacturing factory.

In a structure in which the LED unit 5 is incorporated into the MFP 1 in the manufacturing factory, inspection of whether or not the LED unit 5 operates normally (has no abnormality) needs to be performed before shipping. Accordingly, in the MFP 1, inspection of the LED unit 5 can be performed along an inspection line in the manufacturing factory of the MFP 1 without using the server 10, which is the option. The mechanism of this structure is described later.

Note that the server 10 may include a function of, for example, a print server, a mail server, a Web server, a Dynamic Host Configuration Protocol (DHCP) server, a Domain Name System (DNS) server, or the like.

(2) Display of Operation Display Unit

Figure 3A:
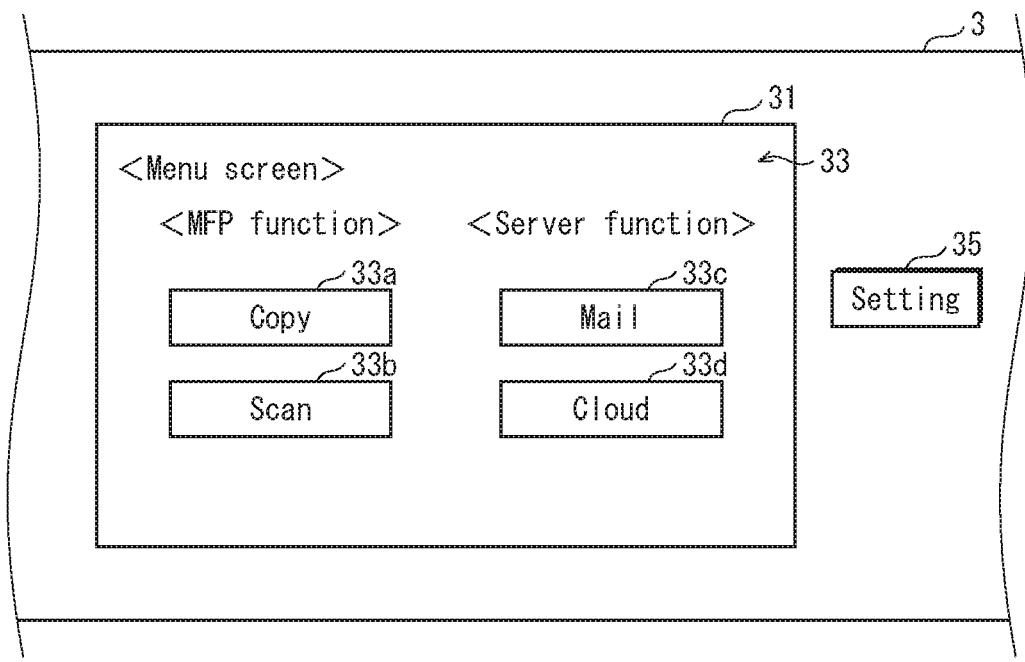
FIG. 3A is a diagram of an example in which a menu screen is displayed on a touch panel of an operation display unit.

FIG. 3A is a diagram of an example in which a menu screen 33 is displayed on the touch panel 31 of the operation display unit 3. The menu screen 33 includes an MFP function column and a server function column. In the MFP function column, a copy button 33a and a scan button 33b are displayed; in the server function column, a mail button 33c and a cloud button 33d are displayed. These buttons are virtual buttons.

The copy button 33a is a button that the user touches when selecting a copy function, and the scan button 33b is a button that the user touches when selecting a scan function. The mail button 33c is a button that the user touches when selecting an e-mail exchange function, and the cloud button 33d is a button that the user touches when selecting the cloud service. As described above, the operation display unit 3 is an operation unit that is shared by the MFP 1 and the server 10.

The mail button 33c and the cloud button 33d are displayed when the server 10 is connected to the MFP 1; when the server 10 is not mounted, the mail button 33c and the cloud button 33d are grayed out and do not accept touch-input.

The operation display unit 3 includes a setting button 35 at a position to the right relative to the touch panel 31. The setting button 35 is a physical button, and is provided for setting an inspection mode for performing operation confirmation inspection of the printing unit 2b, the LED unit 5, or the like in the manufacturing factory of the MFP 1.

Figure 3B:
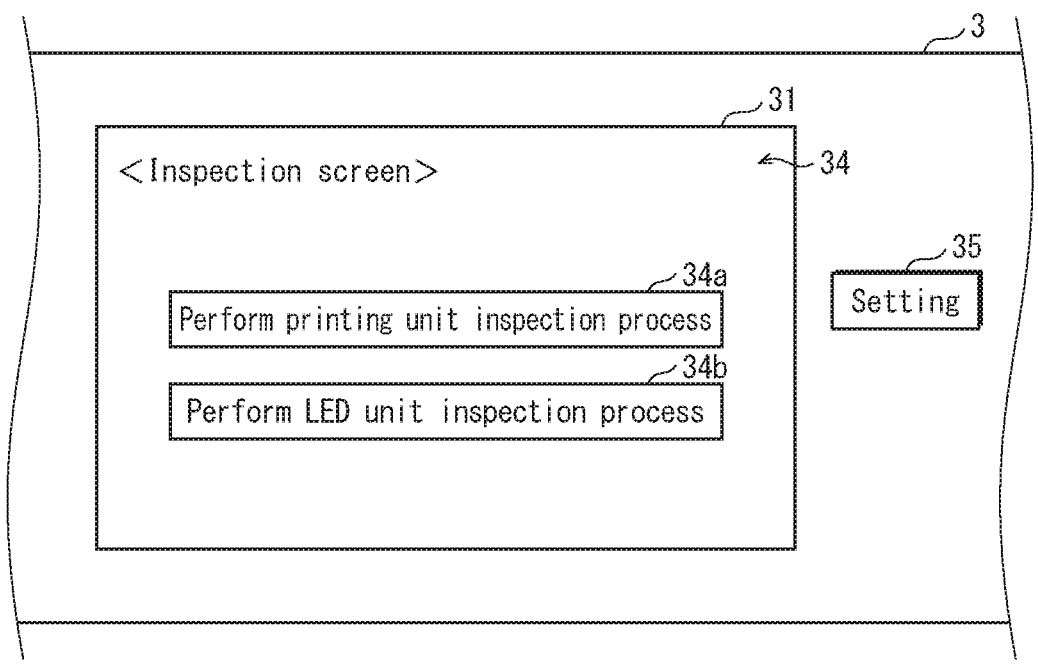
FIG. 3B is a diagram of an example in which an inspection screen is displayed on the touch panel.

FIG. 3B is a diagram of an example in which the touch panel 31 displays an inspection screen 34 that is displayed when in the inspection mode. The inspection screen 34 includes a button 34a for selecting inspection of the printing unit 2b and a button 34b for selecting inspection of the LED unit 5.

When a person who is in charge of inspection in the manufacturing factory of the MFP 1 (inspector) performs touch-input of the button 34a, the MFP 1 transitions to a print inspection mode and the printing unit 2b automatically performs a defined printing operation such as printing a defined test pattern image onto a sheet.

When the inspector performs touch-input of the button 34b, the MFP 1 transitions to an LED inspection mode and a defined process for inspecting whether or not the LED unit 5 is operating normally is automatically performed. Such a defined process is, for example, repeating a defined display process that is a set of processes of supplying current for a defined time period (e.g. one second) such that all the LEDs in the LED unit 5 are lit (all-on) and then shutting off the current for a defined time period (e.g. one second) such that all the LEDs are off (all-off), for a defined number of times (e.g. three times). Such a defined process is referred to as a display inspection process.

The inspector can recognize by sight whether or not there is an LED that is off during the all-on state of the display inspection process of the LED unit 5. When there is no LED that is off, the inspector can determine that there is no malfunctioning; when there is one or more LEDs that are off, the inspector can determine that there is malfunctioning. Further, when there is no LED that is lit during the all-off state, the inspector can determine that there is no malfunctioning; when there is one or more LEDs that are lit during the all-off state, the inspector can determine that there is malfunctioning. The inspector can thus inspect whether or not the LED unit 5 functions normally. When the display inspection process ends, the MFP 1 automatically transitions from the inspection mode to a normal mode (mode in which functions other than the inspection, such as copying, can be performed), and the touch panel 31 switches to a display of the menu screen 33 in FIG. 3A.

(3) How MFP 1 and Server 10 are Controlled

Figure 4:
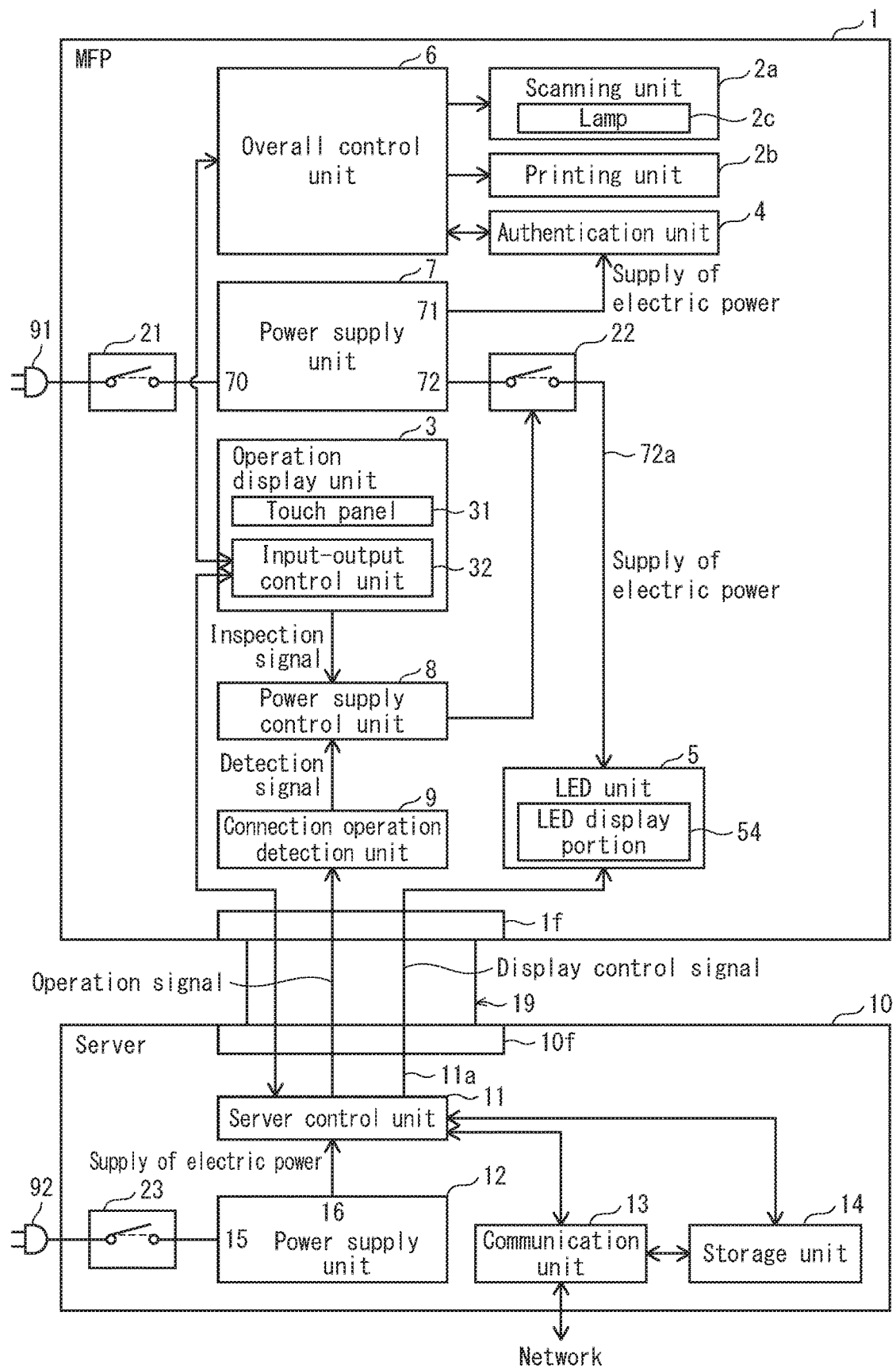
FIG. 4 is a control block diagram of the MFP and the server.

FIG. 4 is a control block diagram of the MFP 1 and the server 10, showing a state in which the server 10, which is the option, is mounted to the MFP 1.

In FIG. 4, the MFP 1 includes the overall control unit 6, a power supply unit 7, a power supply control unit 8, and a connection operation detection unit 9, in addition to the scanning unit 2a, the printing unit 2b, the operation display unit 3, the authentication unit 4, and the LED unit 5. The server 10 includes a server control unit 11, a power supply unit 12, a communication unit 13, and a storage unit 14.

Here, an interface if of the MFP 1 and an interface 10f of the server 10 are connected through a cable 19 such that the MFP 1 and the server 10 mutually exchange signals and data. For the interfaces, for example, Universal Serial Bus (USB) or Ethernet (registered trademark) is used.

Whether or not the server 10 is connected to the MFP 1 is detected by the connection operation detection unit 9. Specifically, when the interface if of the MFP 1 and the interface 10f of the server 10 are connected to each other through the cable 19, the connection operation detection unit 9 detects that the server 10 is connected to the MFP 1 by receiving, from the server control unit 11, a defined signal indicating that the server 10 is operating normally (operation signal), and transmits a detection signal indicating normal connection of the server 10 to the power supply control unit 8.

Note that connection is not detected when the server 10 is not operating normally, e.g. when electric power is not supplied to the server 10 or when the server 10 is broken, even if the interface 1f and the interface 10f are physically connected to each other through the cable 19. This is due to the operation signal not being output from the server control unit 11 to the MFP 1 and the MFP 1 not being able to communicate normally with the server control unit 11.

That is, the expression "the server 10 is connected to the MFP 1" indicates cases in which the MFP 1 can communicate normally with the server control unit 11. While the MFP 1 and the server 10 are connected to each other through the interfaces 1f and 10f, the LED unit 5 and the server control unit 11 are also connected to each other through a signal cable 11a, thereby enabling the server control unit 11 to control the LED unit 5. Accordingly, detection of connection of the server 10 to the MFP 1 is equivalent with detecting that the server control unit 11 and the LED unit 5 are connected with each other such that the server control unit 11 can control the LED unit 5.

The overall control unit 6 of the MFP 1 is a computer system including components such as a central processing unit (CPU) and various semiconductor memories (such as a random-access memory (RAM) and a read-only memory (ROM)), and integrally controls the scanning unit 2a and the printing unit 2b to cause the scanning unit 2a and the printing unit 2b to respectively perform smooth scanning operations and printing operations.

The overall control unit 6 controls the authentication unit 4 to determine whether or not the user can use the MFP 1 in accordance with a user authentication result acquired from the authentication unit 4.

Specifically, when user authentication is performed normally, the overall control unit 6 performs MFP 1 usage allowance of instructing the operation display unit 3 to display the menu screen 33 in FIG. 3A, such that input operations by the user are accepted. When the user authentication is not performed normally (authentication error), the overall control unit 6 performs MFP 1 usage rejection of causing the operation display unit 3 to simply display, instead of the menu screen 33, a message indicating that the MFP 1 cannot be used due to authentication error and prohibits acceptance of input operations by the user. In this sense, the overall control unit 6 functions as a device control unit controlling the scanning unit 2a, the printing unit 2b, and the authentication unit 4, which are the second devices.

The operation display unit 3 includes, in addition to the touch panel 31, an input-output control unit 32. The input-output control unit 32 exchanges input signals and output signals with the overall control unit 6, causes the touch panel 31 to display the screen instructed by the overall control unit 6, and transmits, to the overall control unit 6, information that the user inputs by performing touch-input on the touch panel 31. For example, when the copy button 33a in the menu screen 33 displayed on the touch panel 31 is touched, the overall control unit 6 is informed of the input of the copy button 33a by the input-output control unit 32. Then, the overall control unit 6 instructs the input-output control unit 32 to display a defined copy function screen for performing a copy job (not illustrated), and the input-output control unit 32 causes the touch panel 31 to display the copy function screen. When the user performs touch-input in the copy function screen, the information of the touch-input is transmitted from the input-output control unit 32 to the overall control unit 6, and the overall control unit 6 performs a copy job based on the received information.

Further, when the button 34b for inspection of the LED unit 5 in the inspection screen 34 displayed on the touch panel 31 is touched, the input-output control unit 32 transmits, to the power supply control unit 8, an inspection signal initiating the display inspection process of the LED unit 5. Transmission of the inspection signal from the input-output control unit 32 to the power supply control unit 8 is performed from a start to an end of the display inspection process of the LED unit 5, i.e. from a time point at which the MFP 1 transitions from the normal mode to the LED inspection mode to a time point at which the MFP 1 returns to the normal mode.

When the server 10 is connected to the MFP 1, the input-output control unit 32 exchanges input-output signals with the server control unit 11 and causes the touch panel 31 to display a screen instructed by the server control unit 11. Further, the input-output control unit 32 transmits, to the server control unit 11, information that the user inputs by performing touch-input on the touch panel 31.

For example, when the mail button 31c in the menu screen 33 is touched, the server control unit 11 is informed of the input of the mail button 31c by the input-output control unit 32. Then, the server control unit 11 instructs the input-output control unit 32 to display a defined mail function screen for performing an e-mail function (not illustrated), and the input-output control unit 32 causes the touch panel 31 to display the mail function screen. When the user performs touch-input in the mail function screen, the information of the touch-input is transmitted from the input-output control unit 32 to the server control unit 11, and the server control unit 11 performs the e-mail function based on the received information.

The power supply unit 7 of the MFP 1 is, for example, a power supply device such as a switching-mode power supply, and supplies electric power to the authentication unit 4 and the LED unit 5.

The power supply unit 7 includes an input terminal 70 and output terminals 71 and 72.

The input terminal 70 is connected through a power supply switch 21 and a power supply plug 91 to a power supply outlet of an external commercial power supply (not illustrated). The output terminal 71 is connected to the authentication unit 4. The output terminal 72 is connected through a power supply line 72a to the LED unit 5, and a switch 22 is disposed along the power supply line 72a.

When the power supply switch 21 is on (connected) (a state indicated by a broken line in FIG. 4), electric power supplied from the commercial power supply is input through the power supply plug 91 and the power supply switch 23 to the input terminal 15.

The power supply unit 7 converts a voltage (for example, an alternating voltage) that is input to the input terminal 70 to a defined voltage (for example, direct voltage) that is suitable for operations of the authentication unit 4 and the LED unit 5 and outputs the electric power after conversion from the output terminals 71 and 72.

The authentication unit 4 operates by receiving electric power that is output from the output terminal 71 of the power supply unit 7.

When the switch 22 is on (connected) (a state indicated by a broken line in FIG. 4), the LED unit 5 operates by receiving electric power that is output from the output terminal 72 of the power supply unit 7 through the power supply line 72a; when the switch 22 is off (not connected) (a state indicated by a solid line in FIG. 4), the LED unit 5 cannot operate because the LED unit 5 cannot receive electric power that is output from the output terminal 72 of the power supply unit 7. As described above, the power supply unit 7 is shared by the authentication unit 4 and the LED unit 5, and electric power is supplied from the power supply unit 7 to the authentication unit 4 irrespective of whether the switch 22 is on or off.

Switching on and off of the switch 22 is controlled by the power supply control unit 8.

The power supply control unit 8 turns on the switch 22 only when one of the following conditions (α) and (β) is satisfied: (α) when the server 10 is not connected and the power supply control unit 8 is receiving an inspection signal from the input-output control device 32 of the operation display unit 3; and (β) when the server 10 is connected, i.e. when the power supply control unit 8 is receiving the detection signal from the connection operation detection unit 9.

The condition (α) supposes a situation in which, in the manufacturing factory of the MFP 1, the server 10 is not connected and inspection of the LED unit 5 is performed in the LED inspection mode. Upon switching of the switch 22 to the on-state during the LED inspection mode, electric power is supplied (electric power feeding) from the power supply unit 7 to the LED unit 5. As described later, the LED unit 5 has a function of performing the display inspection process described above upon a start of receiving of electric power supplied from the power supply unit 7. Accordingly, the display inspection process is automatically performed upon transition into the LED inspection mode. Due to this, in the manufacturing factory, the inspector can inspect by sight whether or not the LED unit 5 operates normally.

When the LED inspection mode ends and the MFP 1 returns to the normal mode, the condition (α) is no longer satisfied. Here, if the server 10 is not connected, the condition (β) is not satisfied either. Accordingly, the switch 22 returns to the off-state, and supply of electric power from the power supply unit 7 to the LED unit 5 is shut off.

When the MFP 1 is installed into the user's office after shipping from the manufacturing factory and the server 10 is not connected, the condition (β) is not satisfied. Accordingly, the switch 22 remains in the off-state, and supply of electric power from the power supply unit 7 to the LED unit 5 also remains shut off. When the server 10 is connected to the MFP 1 later, the condition (β) is satisfied. Accordingly, the switch 22 is turned on, and electric power is supplied from the power supply unit 7 to the LED unit 5. In this sense, the power supply control unit 8 and the switch 22 function as a switching unit that switches on and off electric power supply from the power supply unit 7 to the LED unit 5.

When the LED unit 5 receives a display control signal from the server control unit 11 while the LED unit 5 is receiving electric power from the power supply unit 7 through the switch 22, the LED unit 5 displays a display image (described later) on the basis of the display control signal by controlling on and off of the LEDs in the LED display portion 54.

The power supply unit 12 of the server 10 is, for example, a power supply device such as a switching-mode power supply, and includes an input terminal 15 and an output terminal 16. The input terminal 15 is connected through a power supply switch 23 and a power supply plug 92 to a power supply outlet of an external commercial power supply (not illustrated). The output terminal 16 is connected to the server control unit 11.

When the power supply switch 23 is on (connected) (a state indicated by a broken line in FIG. 4), electric power supplied from the commercial power supply is input through the power supply plug 92 and the power supply switch 23 to the input terminal 15.

The power supply unit 12 converts a voltage (for example, alternating voltage) that is input to the input terminal 15 to a defined voltage (for example, direct voltage) that is suitable for operations of the server control unit 11 and outputs the electric power after conversion from the output terminal 16. The server control unit 11 operates by receiving electric power output from the output terminal 16 of the power supply unit 12.

The communication unit 13 is connected to a network and can communicate through the network with an external terminal device. In network communication, various protocols such as Transmission Control Protocol/Internet Protocol (TCP/IP) are used. By such network communication, the server 10 can send and receive various kinds of data in cooperation with a desired destination.

Further, when image data is uploaded to the cloud service, the communication unit 13 transmits, to the server control device 11, information indicating a state of progress from a start to an end of uploading of the image data (progress state information).

Specifically, during the uploading, the communication unit 13 acquires an accumulated value of a data amount that is actually transmitted after the start of the uploading (accumulated data amount) upon elapse of each unit time period, and calculates, for each unit time period, a ratio (percentage) Z of the acquired accumulated data amount to a total data amount of an uploading target file. For example, the ratio Z is 5%, 10%, 15%, or the like.

The greater the ratio Z, the larger the data amount that has been transmitted after the start of the uploading. Accordingly, the ratio Z serves as the progress state information that indicates to what extent the uploading has progressed.

Similarly for downloading, during a time period from a start to an end of the downloading, the communication unit 13 transmits, per each unit time period, progress state information at the current time point, i.e. a ratio Z of a received cumulative data amount to a total data amount of a downloading target file to the server control unit 11.

The server control unit 11 integrally controls the server 10 and the LED unit 5, and is a computer system including components such as a CPU and various semiconductor memories (RAM and ROM). Note that the control of the LED unit 5 by the server control unit 11 is performed when electric power is supplied from the power supply unit 7 to the LED unit 5.

The server control unit 11 receives the progress state information (ratio Z described above) from the communication unit 13 per each unit time period when performing the cloud service, and transmits a value of the ratio Z, i.e. a display control signal indicating a state of progress, through the signal cable 11a to the LED unit 5 each time the received ratio Z reaches a defined value, e.g. a multiple of 10 (that is, 10%, 20%, 30%, . . . ).

The LED unit 5 displays an image indicating a current state of progress of uploading or downloading through causing only LEDs, among all the LEDs included in the LED display portion 54, that are selected based on the display control signal from the server control unit 11 to emit light.

Figure 5A:
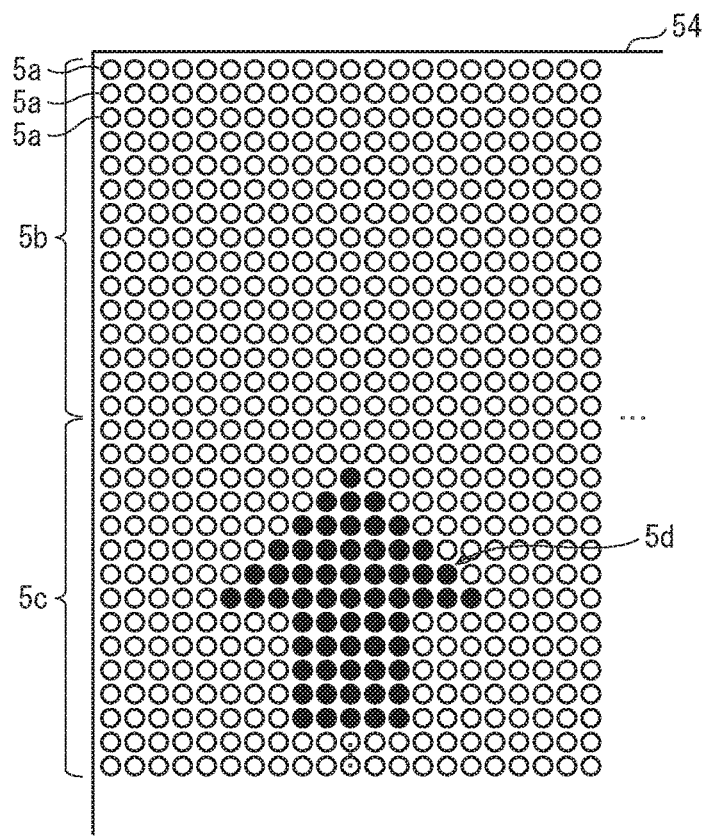
FIG. 5A and FIG. 5B are diagrams of portions of progress state display images displayed on an LED display portion.
Figure 5B:
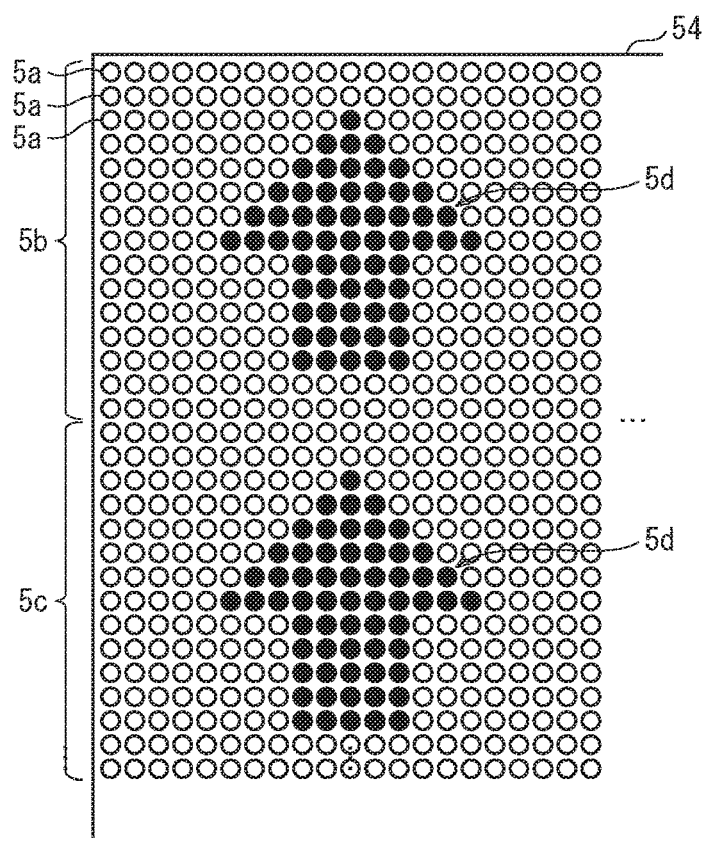

FIG. 5A and FIG. 5B are diagrams of portions of progress state display images displayed on the LED display portion 54. In FIG. 5A and FIG. 5B, ones of the LED 5a that are black are lit and ones of the LED 5a that are not black are off.

In FIG. 5A, the LED display portion 54 is divided in the upper-lower direction into a plurality of blocks 5b, 5c, . . . , and among all the LEDs 5a included in the block 5c, which is the second highest block in the upper-lower direction, only ones of the LEDs 5a for displaying an up-arrow image 5d are lit. By looking at the LED display portion 54, the user can recognize by sight that a single arrow image 5d is displayed.

This arrow image 5d illustrates a current state of progress of uploading, and the greater the number of arrow images 5d are, the more the uploading has progressed.

In FIG. 5B, on the LED display portion 54, the two blocks 5b and 5c that are adjacent to each other in the upper-lower direction each display an arrow image 5d, and the number of the arrow images 5d is greater by one than the progress state display image in FIG. 5A. Due to this, the user can recognize that uploading has progressed to a greater extent at a time point when the progress state display image in FIG. 5B is displayed than at a time point at which the progress state display image in FIG. 5A is displayed.

For example, a control of changing the progress state display image such that the number of the arrow images 5d increases by one each time the ratio Z reaches a multiple of 10 (i.e. 10%, 20%, 30%, . . . ) enables the user to easily recognize, when a time period from the start to the end of the uploading is divided into ten stages, to which stage the uploading has progressed.

A similar structure may be used in cases of downloading; for example, down-arrow images are displayed instead of the up-arrow images 5d in cases of downloading, and the number of the down-arrow images may be increased in accordance with progress of the downloading.

As described above, by transmitting a display control signal to the LED unit 5 to which electric power is supplied, the server control unit 11 can perform a control of lighting of the LEDs of the LED unit 5, such as a switching control of a state of progress of uploading or downloading by the cloud service as a progress state display image as in FIG. 5A and FIG. 5B.

Referring back to FIG. 4, the storage unit 14 of the server 10 includes a storage device such as a non-volatile semiconductor memory, and stores, for example, data such as images, documents, and/or the like received by the communication unit 13 through network communication, data such as images downloaded by the cloud service, and/or data such as image data obtained through the scanning function of the MFP 1.

Image data stored in the storage unit 14 is read out from the storage unit 14, and is used by the MFP 1 for a print job and/or is uploaded by the cloud service.

(4) Structure of Printing Unit 2b of MFP 1

Figure 6:
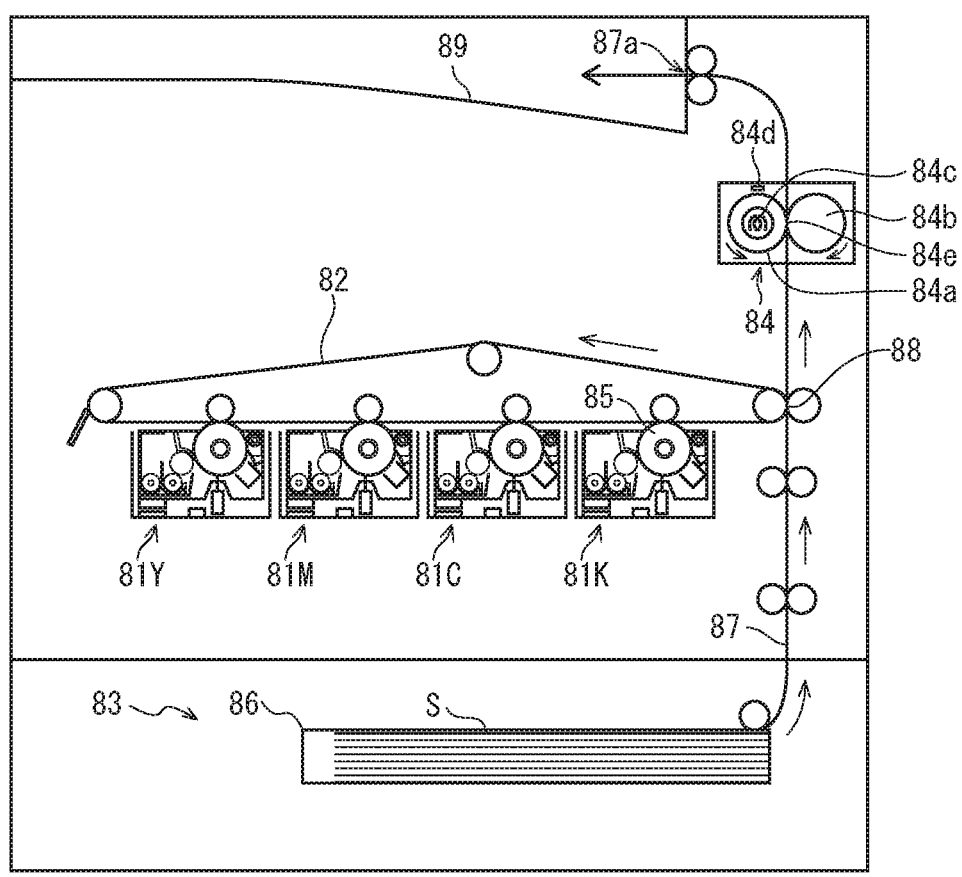
FIG. 6 is a diagram of a structure of a printing unit of the MFP.

FIG. 6 is a diagram of a structure of the printing unit 2b. In FIG. 6, the printing unit 2b is an electrophotographic printing unit, and includes: image forming units 81Y, 81M, 81C, and 81K respectively corresponding to colors of yellow (Y), magenta (M), cyan (C), and black (K); an intermediate transfer belt 82; a sheet feed unit 83; and a fixing unit 84.

The image forming units 81Y, 81M, 81C, and 81K respectively form toner images of corresponding colors (Y, M, C, and K) onto photoreceptor drums 85. The toner images of the colors Y, M, C, and K formed on the photoreceptor drums 85 respectively corresponding to the image forming units 81Y, 81M, 81C, and 81K are transferred (multiple transfer) onto the rotating intermediate transfer belt 82 to form a multi-colored toner image (primary transfer). The sheet feed unit 83 picks up a recording sheet S stored in a sheet feed cassette 86 and feeds the sheet S to a conveyance path 87 such that the sheet S is conveyed along the conveyance path 87.

The sheet S is conveyed from the sheet feed unit 83 to a secondary transfer position 88 in accordance with a time point at which the toner image, which has been transferred onto the intermediate transfer belt 82 through the primary transfers, reaches the secondary transfer position 88. When the sheet S passes through the secondary transfer position 88, the toner image on the intermediate transfer belt 82 is transferred onto the sheet S (secondary transfer). The recording sheet S, after passing through the secondary transfer position 88, is conveyed to the fixing unit 84.

The fixing unit 84 includes: a fixing roller 84a (fixing member); a pressurizing roller 84b that is in pressure-contact with the fixing roller 84a and forms a fixing nip 84e; a heater 84c that heats the fixing roller 84a; and a temperature detection sensor 84d that detects a surface temperature of the fixing roller 84a.

Based on the detection result of the temperature detection sensor 84d, the overall control unit 6 controls electric power supplied to the heater 84c such that the surface temperature of the fixing roller 84a increases to a fixing temperature that is required for a thermal fixing (for example, 170° C.) and is maintained at the fixing temperature.

When the sheet S passes through the fixing nip 84e with the surface temperature of the fixing roller 84a maintained at the fixing temperature, the toner image on the sheet S (unfixed image) is fixed onto the sheet S by heating and pressurizing. The sheet S that has passed through the fixing unit 84 is conveyed further downstream along the conveyance path 87, is ejected from the ejection port 87a, and is stored on the sheet ejection tray 89.

(5) Structure of LED Unit 5

Figure 7:
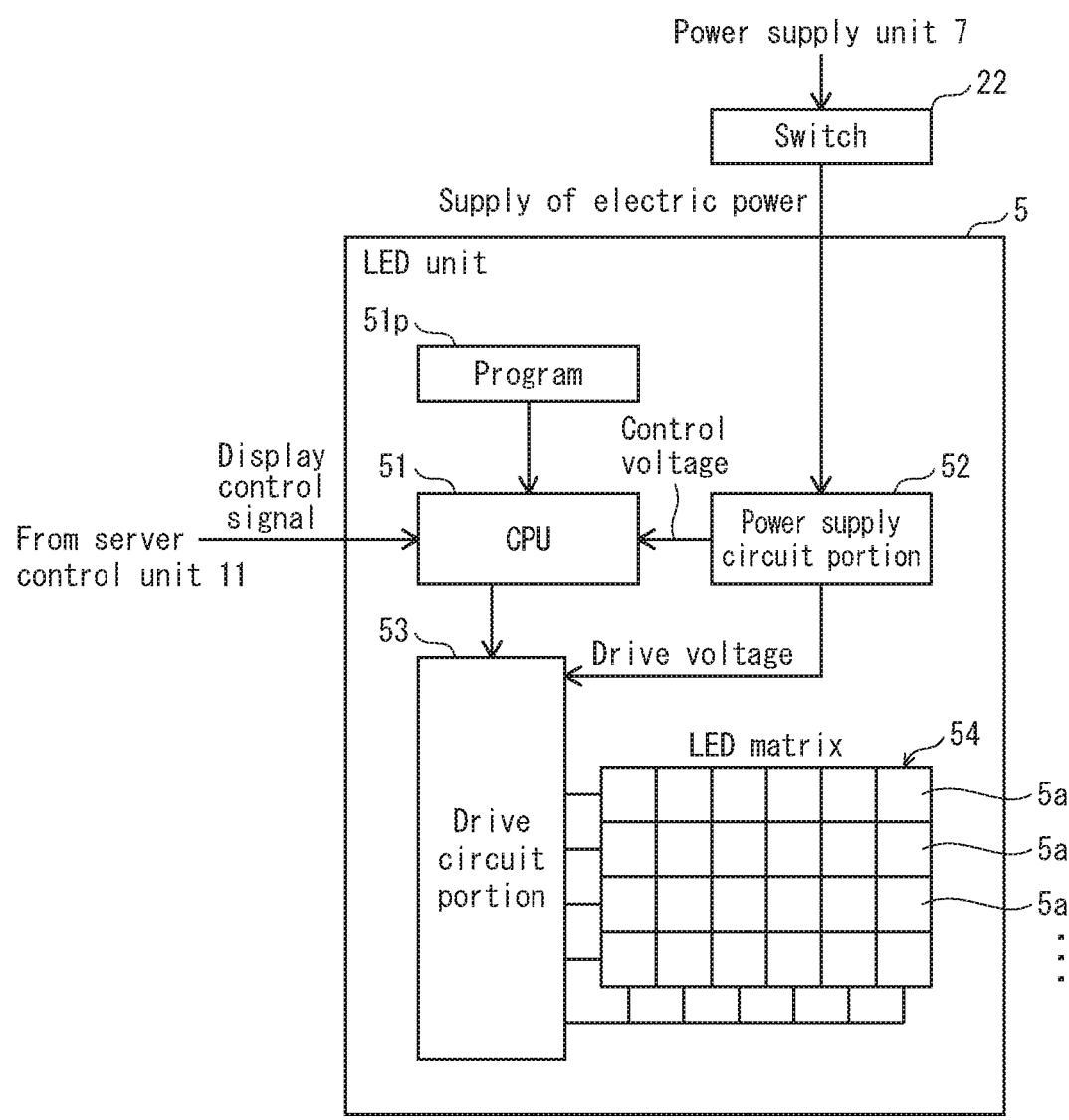
FIG. 7 is a block diagram of a structure of the LED unit.

FIG. 7 is a block diagram illustrating a structure of the LED unit 5.

In FIG. 7, the LED unit 5 includes a CPU 51, a power supply circuit portion 52, a drive circuit portion 53, and the LED display portion 54.

The LED display portion 54 includes many LEDs 5a that are arranged in a form of a two-dimensional matrix in the upper-lower direction and the left-right direction that is orthogonal to the upper-lower direction.

The power supply circuit portion 52 is connected through the switch 22 to the output terminal 72 of the power supply unit 7. When the power supply circuit portion 52 receives electric power from the power supply unit 7 when the switch 22 is on, the power supply circuit portion 52 converts the received voltage to a defined voltage that is suitable for the CPU 51 and the drive circuit portion 53, and outputs the converted voltage to the CPU 51 as a control voltage and to the drive circuit portion 53 as a drive voltage. The CPU 51 and the drive circuit portion 53 operate by using electric power supplied from the power supply circuit portion 52.

When the CPU 51 receives a display control signal from the server control unit 11, the CPU 51 instructs the drive circuit portion 53 to perform an LED lighting display based on the received display control signal. For example, when the display control signal is a signal indicating that the ratio Z described above is 10%, the CPU 51 instructs the drive circuit portion 53 to display the progress state display image illustrated in FIG. 5A, in which a single arrow image 5d is displayed.

The drive circuit portion 53 causes to emit light only LEDs 5a, among all the LEDs 5a that are arranged in a matrix, that are supposed to emit light based on the instruction from the CPU 51. For example, in the case of an instruction of a display of the progress state display image in FIG. 5A, a plurality of LEDs 5a that are black in FIG. 5A among all the LEDs 5a included in the block 5c are lit. When the number of the LEDs 5a that are lit is greater, the electric power amount consumed by the LED unit 5 is larger and therefore the electric power amount supplied from the power supply unit 7 to the LED unit 5 is larger, and therefore is a large load for the power supply unit 7.

Further, the CPU 51 instructs, independently from the display instruction to the drive circuit portion 53 through the display control signal from the server control unit 11, the drive circuit portion 53 to start the display inspection process described above in accordance with a start of supply of electric power from the power supply unit 7 to the LED unit 5, i.e. in accordance with switching of the switch 22 from the off-state to the on-state. The CPU 51 reads out a program 51p for executing the display inspection process upon a start of receiving of supplied electric power, irrespective of whether or not a display control signal is transmitted from the server control unit 11, and instructs the drive circuit portion 53 to start the display inspection process based on the read program 51p. The program 51p is stored in advance in a storage portion that is not illustrated.

Upon receiving the instruction of the start of the display inspection process from the CPU 51, the drive circuit portion 53 starts the display inspection process described above through controlling lighting of the LEDs 5a of the LED display portion 54. In this sense, the CPU 51 and the drive circuit portion 53 function as an execution unit that causes the LED display portion 54 as an inspection target portion to execute, independently from the display control by the server 10, a self-diagnostic inspection function of the LED unit 5, i.e. a defined inspection process corresponding to an inspection of whether or not the LED unit 5 operates normally (display inspection process), automatically upon receiving electric power supplied from the power supply unit 7.

(6) Switching Supply and Stoppage of Electric Power from Power Supply Unit 7 to LED Unit 5

FIG. 8 is a diagram of how supply and stoppage of electric power to the LED unit 5 switches in accordance with the operation modes of the MFP 1. Here, in FIG. 8, "on" and "off" in the MFP power supply row refer to on and off of the power supply switch 21 of the MFP 1, respectively, and when the power supply switch 21 is on, the MFP operation row indicates the normal mode or the LED inspection mode.

State 1 indicates a state in which the server 10 is not mounted and the MFP power supply is off. In this state, the power supply unit 7 does not supply electric power to the LED unit 5 because the power supply switch 21 is off and therefore the power supply unit 7 does not operate.

State 2 indicates a state in which the server 10 is not mounted, the MFP power supply is on, and the MFP 1 is in the normal mode. Here, the power supply unit 7 operates because the power supply switch 21 is on. However, because the server 10 is not connected and the MFP 1 is not in the inspection mode, the switch 22 remains off and electric power is not supplied from the power supply unit 7 to the LED unit 5.

In contrast, State 3 indicates a state in which the server 10 is not mounted, the MFP power supply is on, and the MFP 1 is in the LED inspection mode. This state satisfies the condition ($\alpha$) described above. Accordingly, the switch 22 switches from off to on, and supply of electric power from the power supply unit 7 to the LED unit 5 is started. Due to this, the display inspection process described above is automatically performed.

State 4 indicates a state in which the MFP 1 has transitioned from the LED inspection mode to the normal mode (the same as State 2). The condition ($\alpha$) described above is no longer satisfied, and therefore the switch 22 switches from on to off and supply of electric power from the power supply unit 7 to the LED unit 5 is shut off.

As described above, if the server 10 is not mounted, supply of electric power to the LED unit 5 is allowed only while the MFP 1 is in the LED inspection mode and the display inspection process is being performed. Due to this structure, in the manufacturing factory of the MFP 1, the inspector can inspect whether or not the LED unit 5 operates normally in a state in which the server 10, which is the option, is not mounted.

Further, even after the MFP 1 is shipped from the manufacturing factory and is installed into the user's office or the like, supply of electric power to the LED unit 5 is shut off even when the MFP is on (when the MFP 1 is operating in the normal mode) as long as the server 10, which is the option, is not mounted. This helps to prevent continuous consumption of standby electric power supplied to the LED unit 5 controlled by the server 10, i.e. the LED unit 5 that is not used for a display of images such as progress state display images when the server 10 is not mounted.

FIG. 9 is a diagram of how supply and stoppage of electric power to the LED unit 5 is switched in accordance with whether or not the server 10 is connected. In FIG. 9, "On" and "Off" in the Server power supply row refer to on and off of the power supply switch 23 of the server 10, respectively.

Further, "Mounted" in the Server 10 row indicates a state in which the server 10 is stored in the device housing 1a of the MFP 1 and the interface if of the MFP 1 is physically connected through the cable 19 to the interface 10f of the server 10. This row is not affected by whether the server power supply is on or off, and therefore this row includes a state in which the server 10 is mounted although the server power supply is off.

For example, whether or not the server 10 is mounted is detected as described below. Two terminals among a plurality of terminals in the interface 10f of the server 10 are connected through a jumper wire. The MFP 1 can detect conduction between the two terminals in the interface 10f of the server 10 only when the interface if is physically connected through the cable 19 to the interface 10f of the server 10. When the MFP 1 does not detect the conduction between the two terminals in the server 10, the MFP 1 determines that the server 10 is not mounted to the MFP 1; when the MFP 1 detects the conduction, the MFP 1 determines that the server 10 is mounted to the MFP 1. This is referred to as detection of mounting of the server 10.

State 11 indicates a state in which the server 10 is not mounted and the MFP power supply is off. In this state, electric power is not supplied from the power supply unit 7 to the LED unit 5. State 11 is the same state as State 1 described above.

State 12 indicates a state in which the MFP power supply is on, the MFP 1 is in the normal mode, the server 10 is mounted, and the server power supply is off. Here, the server power supply is off, and therefore the server 10 is not connected to the MFP 1. Accordingly, the switch 22 of the MFP 1 is not on, and therefore electric power is not supplied to the LED unit 5.

State 13 differs from State 12 in that the server power supply is on. Because the server power supply is on, the server 10 is connected to the MFP 1, and therefore the condition (β) described above is satisfied. Due to this, the switch 22 of the MFP 1 switches from off to on, and electric power is supplied from the power supply unit 7 to the LED unit 5. This enables the progress state display image of the cloud service to be displayed on the LED unit 5.

State 14 differs from State 13 in that the server power supply returns to the off-state. This state is the same as State 12, and therefore the condition (β) described above is no longer satisfied. Due to this, the switch 22 of the MFP 1 returns from on to off, and supply of electric power from the power supply unit 7 to the LED unit 5 is shut off.

As described above, when the server 10, which is the option, is connected to the MFP 1 by fitting after shipping from the manufacturing factory, supply of electric power to the LED unit 5 is allowed and the display control by the server 10 causes the LED unit 5 to display a progress state display image or the like. By looking at the display image on the LED unit 5, the user can recognize at a glance to what extent uploading or downloading of image data to the cloud service has progressed since the start of the uploading or downloading and/or how much time remains until the end of the uploading or downloading of image data. This contributes to convenience for the user because the user can recognize rough estimation of time remaining until the end of the uploading or downloading.

(7) Control of Switching Supply and Stoppage of Electric Power from Power Supply Unit 7 to LED Unit 5

Figure 10:
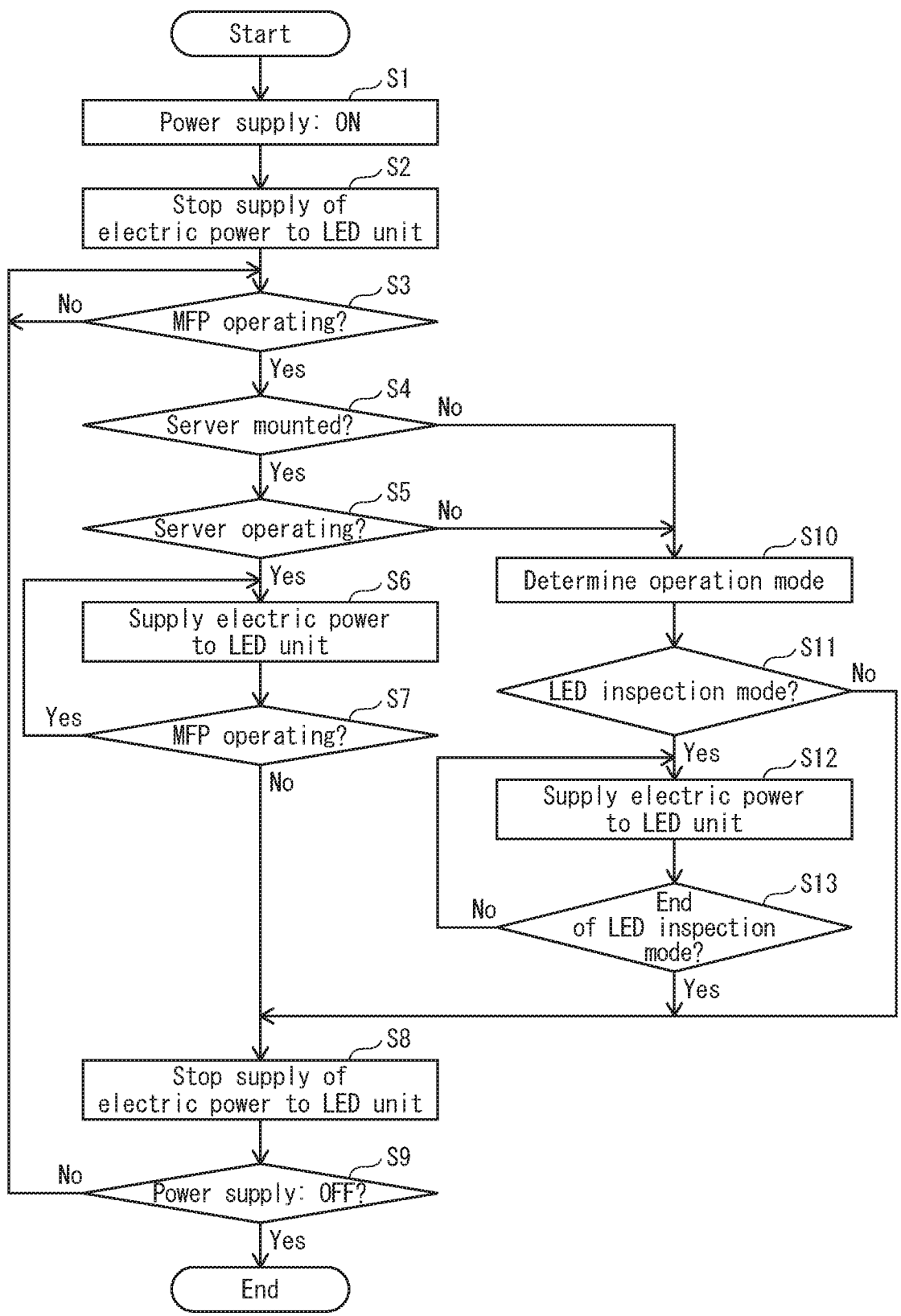
FIG. 10 is a flowchart of a switching control of supply and stoppage of electric power to the LED unit.

FIG. 10 is a flowchart of a control of switching supply and stoppage of electric power to the LED unit 5. This control is performed through cooperation of the following components of the MFP 1: the overall control unit 6, the operation display unit 3, the power supply control unit 8, and the connection operation detection unit 9.

When the power supply switch 21 of the MFP 1 is on (step S1), supply of electric power to the LED unit 5 is stopped (step S2) by turning off the switch 22. When the switch 22 is already off, the off-state is maintained.

Next, determination of whether or not the MFP 1 is operating is performed (step S3). The MFP 1 is referred to as not operating when the MFP 1 is neither in the normal mode nor in the inspection mode (such as the print inspection mode and the LED inspection mode). Specifically, this includes a case in which the MFP 1 is in a power-saving mode and a case in which some trouble occurs in the MFP 1 (the MFP 1 is broken).

When determining that the MFP 1 is operating ("Yes" in step S3), determination of whether or not the server 10 is mounted is performed (step S4) by detection of mounting of the server 10 described above.

When determining that the server 10 is not mounted ("No" in step S4), the process advances to step S10. When determining that the server 10 is mounted ("Yes" step S4), determination of whether or not the server 10 is operating is performed (step S5) based on whether or not an operation signal from the server 10 is received.

When determining that the server 10 is not operating, i.e. when determining that no operation signal is received from the server 10 ("No" in step S5), the process advances to step S10.

In step S10, determination of a current operation mode of the MFP 1 is performed. When determining that the MFP 1 is operating in the LED inspection mode ("Yes" in step S11), electric power is supplied to the LED unit 5 (step S12). Determination that the MFP 1 is in the LED inspection mode is made when an inspection signal is output from the operation display unit 3. Reception of output of an inspection signal by the power supply control unit 8 corresponds to reception of an instruction to perform the display inspection process.

Electric power is supplied to the LED unit 5 by switching the switch 22 from off to on. This causes the display inspection process to be automatically performed in the LED unit 5, and the inspector can inspect the LED unit 5 in the manufacturing factory of the MFP 1.

Supply of electric power to the LED unit 5 continues and the display inspection process of the LED unit 5 is performed until an end of the LED inspection mode, i.e. until the MFP 1 returns to the normal mode ("No" in step S13).

When determination of the end of the LED inspection mode is made ("Yes" in step S13), supply of electric power to the LED unit 5 is stopped (step S8). Determination of the end of the LED inspection mode is made when the inspection signal is no longer output from the operation display unit 3. Stoppage of supply of electric power to the LED unit 5 is achieved by switching the switch 22 from on to off.

When the current operation mode determined in step S10 is not the LED inspection mode, e.g. the normal mode ("No" in step S11), determination is made that no instruction of the display inspection process is received. Steps S12 and S13 are thus skipped (not performed), and the process advances to step S8. Due to this, supply of electric power to the LED unit 5 is shut off when the server 10 is not connected and the display inspection process is not performed. This helps to prevent consumption of standby electric power. Performing steps S10 through 13 corresponds to performing a switching operation of switching supply and shutting-off of electric power to the LED unit 5 in accordance with whether or not an instruction of the display inspection process is received.

Meanwhile, when the server 10 is mounted ("Yes" in step S4) and determination that the server 10 is operating is made, i.e. an operation signal from the server 10 is received ("Yes" in step S5), electric power is supplied to the LED unit 5 (step S6). Here, instead of performing the switching operation of switching supply and shutting-off of electric power to the LED unit 5 in accordance with an instruction of the display inspection process, electric power is supplied to the LED unit 5 (shutting-off of power supply is prohibited) irrespective of the current operation mode (including the LED inspection mode). Determination of "Yes" in step S5 corresponds to a detection unit detecting that the MFP 1 and the server 10 are normally connected to each other, i.e. that the server 10 and the LED unit 5 are connected to each other such that the server 10 can control the LED unit 5.

When the MFP 1 is operating ("Yes" in step S7), supply of electric power to the LED unit 5 continues (step S6). Due to this, the LED unit 5 performs, instead of the display inspection process, display of a progress state display image illustrating a state of progress of uploading or downloading when the server 10 performs the cloud service as an operation based on a control by the server 10.

When the MFP 1 transitions to a state other than operating ("No" step S7), supply of electric power to the LED unit 5 is stopped (step S8).

Then, determination of whether or not the MFP 1 is off is performed (step S9) by detecting turning off of the power supply switch 21. When determining that the MFP 1 is off ("No" in step S9), the process returns to step S3 and performs the steps from step S3. When determining that the MFP 1 has transitioned to the off-state ("Yes" in S9), the control of switching supply and stoppage of electric power to the LED unit 5 ends.

(8) Operation Control of LED Unit 5

Figure 11:
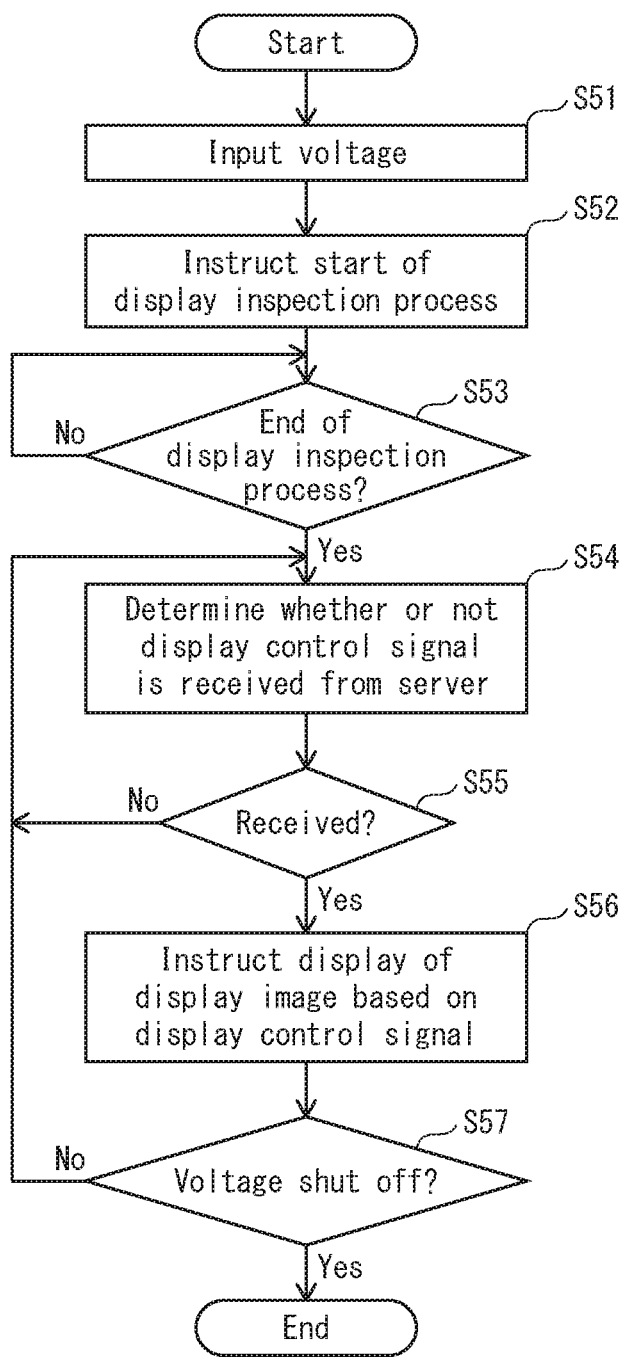
FIG. 11 is a flowchart of an operation control of the LED unit.

FIG. 11 is a flowchart of an operation control of the LED unit 5, which is performed by the CPU 51 of the LED unit 5.

When a control voltage is input from the power supply circuit portion 52 (step S51), the CPU 51 instructs the drive circuit portion 53 to start the display inspection process (step S52). Due to this, the display inspection process of repeating turning on and off all the LEDs 5a in the LED display portion 54 for a defined number of times is performed.

After an end of the display inspection process ("Yes" in step S53), the CPU 51 determines whether or not a display control signal is received from the server 10 (step S54). When no display control signal is received ("No" in step S55), the CPU 51 returns to step S54 and waits for transmission of a display control signal from the server 10. When a display control signal from the server 10 is received ("Yes" in step S55), the CPU 51 instructs the drive circuit portion 53 to display an image based on the received display control signal (step S56).

For example, when the received display control signal is a signal instructing a display of a progress state display image in FIG. 5A in which a single arrow image 5d is displayed, the progress state display image in FIG. 5A is displayed on the LED display portion 54. The drive circuit portion 53 continues the current image display until an instruction of a display of a new image is received from the CPU 51.

If the input of the control voltage from the power supply circuit portion 52 continues, i.e. is not shut off ("No" in step S57), the CPU 51 returns to step S54 and waits for transmission of a new display control signal from the server control unit 11.

When the CPU 51 receives a new display control signal ("Yes" in step S55), the CPU 51 instructs the drive circuit portion 53 to display an image on the basis of the new display control signal (step S56). This instruction serves to instruct the drive circuit portion 53 to display a new image.

For example, when the progress state display image in FIG. 5A is being displayed and an instruction to display the progress state display image in FIG. 5B is made as an instruction to display a new image, the drive circuit portion 53 causes the LED display portion 54 to display, instead of the progress state display image in FIG. 5A, the progress state display image in FIG. 5B. Due to this, the display image on the LED display portion 54 changes each time a subsequent display control signal is newly transmitted from the server control unit 11 (steps S54 through S57). Note that the LED unit 5 may, upon reception of a display control signal that instructs an end of the display of the current display image, end the display of the current display image and stand by until a new display control signal instructing a display of a new image is received.

When determining that input of the control voltage is shut off ("Yes" in step S57), the CPU 51 ends the operation control.

As described above, the present embodiment includes, in a structure in which the LED unit 5 controlled by the server 10 that is the option is incorporated into the MFP 1 before shipping from the manufacturing factory of the MFP 1, the switch 22 along the power supply line 72a for supplying electric power from the power supply unit 7 of the MFP 1 to the LED unit 5. Further, in the present embodiment, the power supply control unit 8: (i) turns on the switch 22 only when a defined condition (α or β described above) is satisfied; and (ii) maintains the switch 22 off when the defined condition is not satisfied.

Due to this structure, even when the server 10 is not mounted, supply of electric power to the LED unit 5 is allowed and the display inspection process is performed upon receiving an instruction of the LED inspection mode (the condition α being satisfied) along the inspection line in the manufacturing factory. Accordingly, the inspector can inspect the LED unit 5 without having to prepare the server 10, which is the option, along the inspection line.

Further, even when the power supply of the MFP 1 is on after the MFP 1 is shipped from the manufacturing factory and is installed into the user's office or the like, supply of electric power to the LED unit 5 remains off as long as the server 10 is not mounted and no instruction of the LED inspection mode is made (when neither the condition α nor the condition β is satisfied). This helps to prevent continuous consumption of standby electric power supplied to the LED unit 5, which is not used for a display of images such as progress state display images when the server 10 is not mounted.

When the server 10 is connected to the MFP 1 later (when the condition β is satisfied), supply of electric power to the LED unit 5 is allowed. Due to this, the server 10 controls the LED unit 5 such that a progress state display image of uploading or downloading is displayed on the LED unit 5 when the server 10 performs the cloud service. By looking at the progress state display image, the user can recognize that the uploading or downloading is progressing smoothly and recognize rough estimation of how much time remains until the end of the uploading or downloading to/from the cloud service. This contributes to convenience for the user.

Embodiment 2

In Embodiment 1 above, description is given of an example of a structure in which electric power is supplied from the power supply unit 7 of the MFP 1 through the switch 22 to the LED unit 5 (FIG. 4). Embodiment 2 differs from Embodiment 1 in that Embodiment 2 has a structure in which the MFP 1 includes an LED power supply unit that is independent from the power supply unit 7 and is used exclusively for the LED unit 5. Hereinafter, description of the same features as those in Embodiment 1 is not provided in order to avoid duplicate description.

Figure 12:
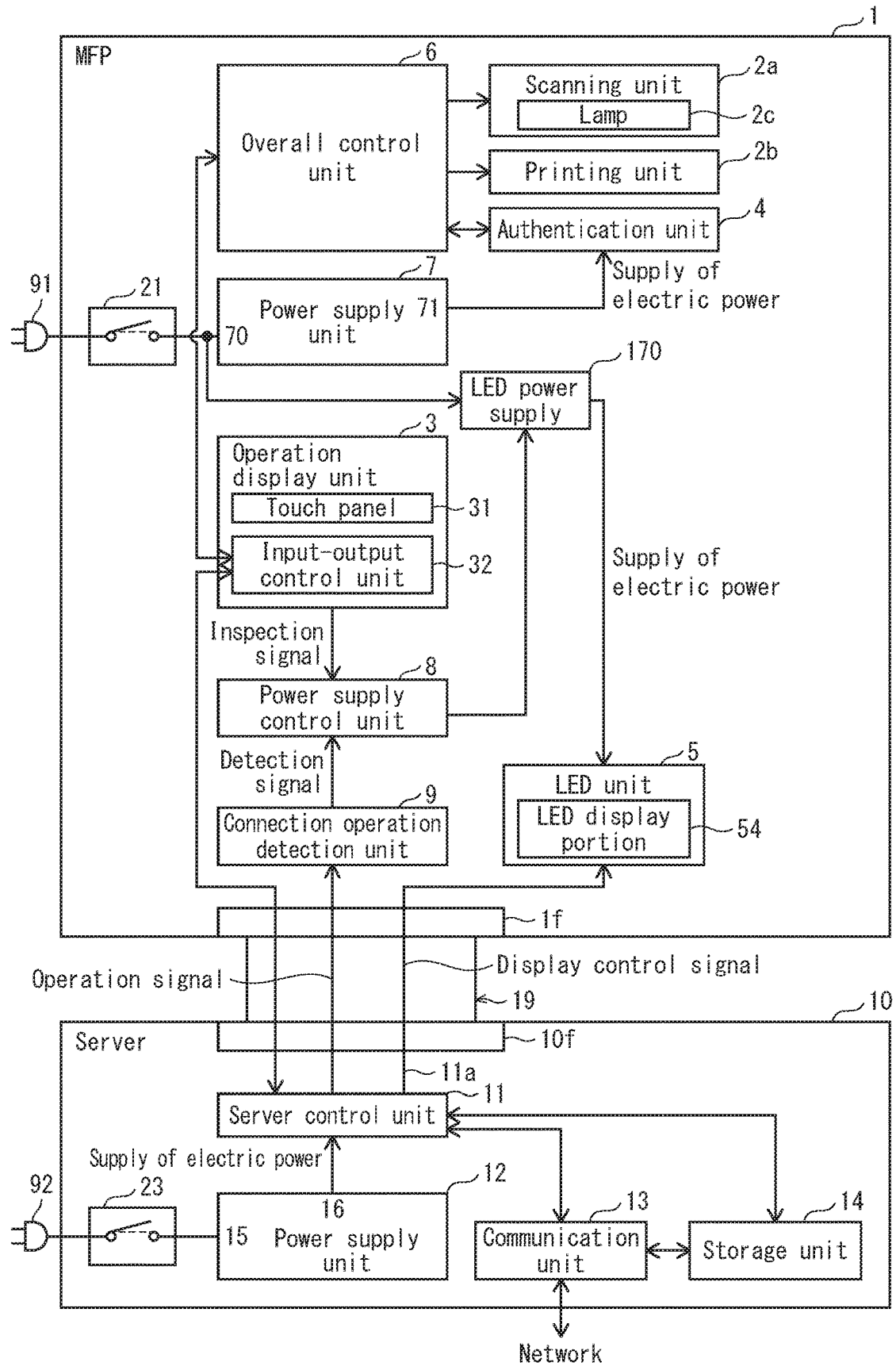
FIG. 12 is a control block diagram of an MFP and a server pertaining to Embodiment 2.

FIG. 12 is a control block diagram of the MFP and the server pertaining to Embodiment 2.

In FIG. 12, the MFP 1 includes the power supply unit 7 and an LED power supply 170 that is independent from the power supply unit 7.

The power supply unit 7 does not supply electric power to the LED unit 5; here, the power supply unit 7 is used for a power supply for components such as the authentication unit 4, the scanning unit 2a, and the printing unit 2b. The LED power supply 170 is used as a power supply exclusively used for the LED unit 5. The power supply unit 7 is also referred to as a second power supply unit.

The LED power supply 170 is connected through the power supply switch 21 and the power supply plug 91 to an external commercial power supply, and is connected to the commercial power supply in parallel with the power supply unit 7. When the power supply switch 21 is on, electric power from the commercial power supply is supplied to the LED power supply 170 as well as to the power supply unit 7.

The LED power supply 170 is a power supply circuit that converts an input voltage supplied from the commercial power supply to a defined voltage suitable for operations of the LED unit 5 and outputs the electric power after conversion to the LED unit 5, and switches output and stoppage of the voltage in accordance with instructions from the power supply control unit 8.

Specifically, the power supply control unit 8 instructs the LED power supply 170 to output electric power only when the condition (α) or the condition (β) described above is satisfied, and instructs the LED power supply 170 to stop output of electric power when neither the condition (α) nor the condition (β) is satisfied. Due to this, in a manner similar to Embodiment 1, electric power is supplied from the LED power supply 170 to the LED unit 5: (i) when the server 10 is not connected and the MFP 1 is in the LED inspection mode; and (ii) when the server 10 is connected. Further, supply of electric power from the LED power supply 170 to the LED unit 5 is shut off when the server 10 is not connected and the MFP 1 is not in the LED inspection mode. In this sense, the power supply control unit 8 functions as a switching unit that switches supply and shutting-off of electric power from the LED power supply 170 to the LED unit 5.

A structure in which a power supply for the LED unit 5 (power supply unit) and a power supply for the authentication unit 4 (second power supply unit) are independent from each other as described above helps to reduce the load of the power supply unit to a greater extent than a structure in which the authentication unit 4 and the LED unit 5 shares a single power supply unit. A structure including power supply units that are independent from each other is specifically advantageous in a structure in which, for example, the power supply unit 7 functions also as a power supply unit for the scanning unit 2a and the printing unit 2b in addition to the authentication unit 4.

Specifically, the lamp 2c of the scanning unit 2a and the heater 84c of the printing unit 2b typically consume a large electric power amount (for example, several hundreds of watts). Accordingly, the power supply unit 7 needs to have a circuit structure that achieves supply of a significant electric power amount even in a structure in which the power supply unit 7 supplies electric power only to the scanning unit 2a, the printing unit 2b, and the authentication unit 4. In a structure in which the power supply unit 7 also has to supply electric power to the LED unit 5, a power supply unit of a larger size needs to be used. However, large-size power supply units typically require high costs and large spaces for installation.

In a structure including the power supply unit 7, which is shared by the authentication unit 4, the scanning unit 2a, and the printing unit 2b, and the LED power supply 170, which is exclusively used for the LED unit 5, small-size power supply units that require relatively small costs and small spaces for installation can be used for the power supply unit 7 and the LED power supply 170. This helps to increase freedom in design.

Embodiment 3

In Embodiment 1 described above, description is given of an example of a structure in which the CPU 51 of the LED unit 5 instructs the drive circuit portion 53 to perform the display inspection process by automatically executing the program 51p, which relates to the display inspection process and is stored in advance, upon a start of voltage supply.

Embodiment 3 differs from Embodiment 1 in that the CPU 51 instructs the drive circuit portion 53 to perform the display inspection process based on an instruction from an inspection device used along the inspection line, instead of using a program that is stored in advance.

Figure 13:
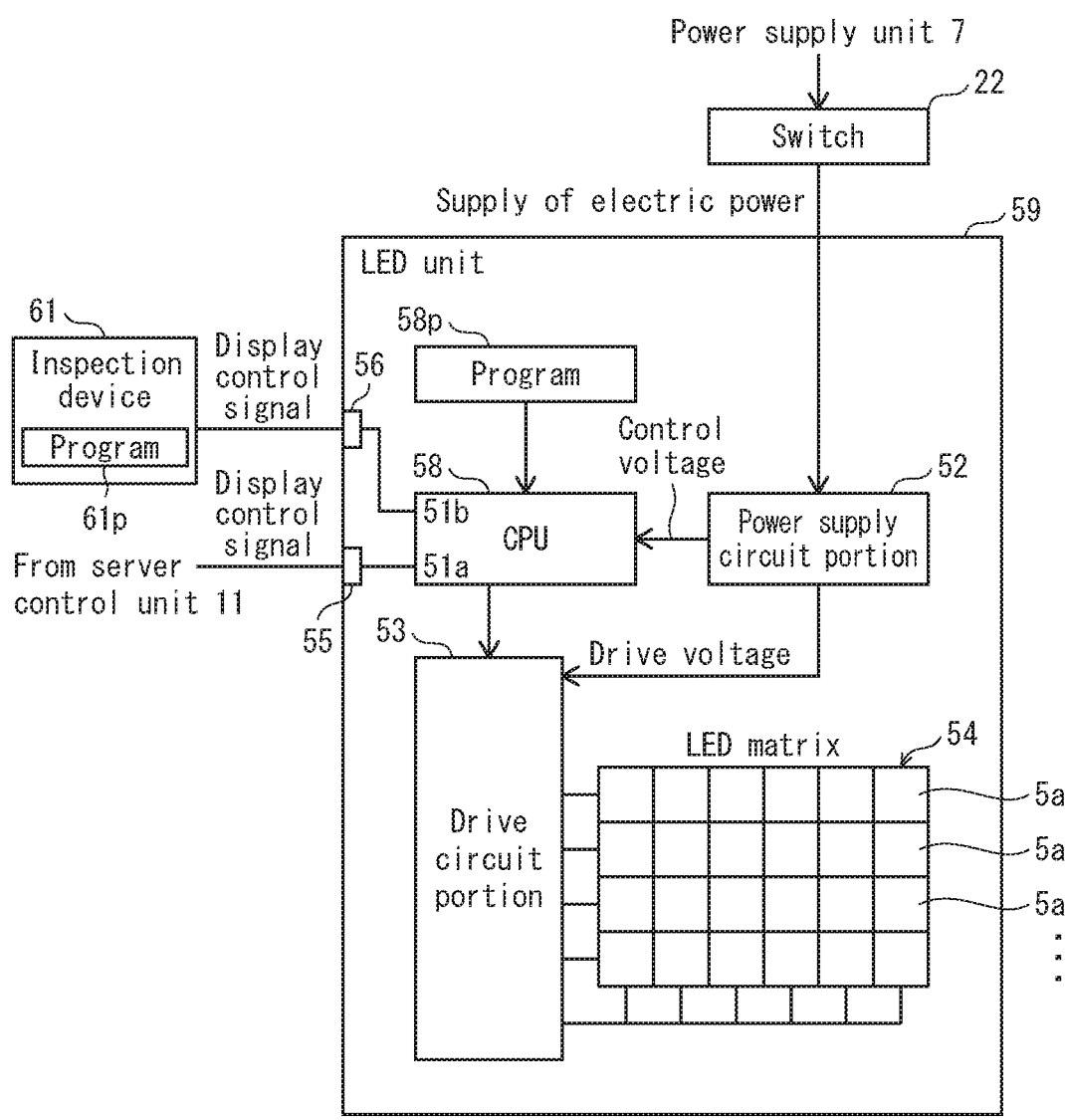
FIG. 13 is a block diagram of a structure of an LED unit pertaining to Embodiment 3.

FIG. 13 is a block diagram of a structure of an LED unit 59 pertaining to Embodiment 3.

In FIG. 13, the LED unit 59 includes a CPU 58 instead of the CPU 51 of the LED unit 5 (FIG. 7) pertaining to Embodiment 1.

The LED unit 59 includes an interface 55 and an interface 56 that are independent from each other. The interface 55 is for connecting to the server control unit 11 (specifically, the signal cable 11a extending from the server control unit 11), and the interface 56 is for connecting to the inspection device 61.

Here, the inspection device 61 is a device operated by the inspector along the inspection line in the manufacturing factory of the MFP 1, and instructs execution of a display inspection process of the LED unit 59 selected from among a plurality of different processes. Such processes are, for example, a process of repeating the all-on state and the all-off state described above alternatingly for a defined number of times (first display inspection process), a process of sequentially supplying current to the two-dimensionally arrayed LEDs 5a from an LED 5a at one end to an LED 5a at the other end one by one in accordance with the order in which the LEDs 5a are arrayed and causing the LEDs 5a to emit light one by one (second display inspection process), and the like.

The inspection device 61 includes a CPU and a ROM (not illustrated) that store in advance a program 61p for instructing selection and execution of the first display inspection process, the second display inspection process, or the like. In contrast, the LED unit 59 does not store a program for the display inspection process; the LED unit 59 stores a program 58p for receiving an instruction from the inspection device 61 and transmitting the instruction to the drive circuit portion 53. The program 58p is a program only for performing a process of transmitting an instruction from the inspection device 61 to the drive circuit portion 53, and therefore the program 58p requires a smaller data amount than the program 61p for instructing selection and execution of the first display inspection process, the second display inspection process, and/or the like.

In the manufacturing factory, when the inspection device 61 is connected to the interface 56 of the LED unit 59, the inspection device 61 instructs, by executing the program 61p, the LED unit 59 to perform the display inspection process.

Upon receiving the control voltage from the power supply circuit portion 52, the CPU 58 of the LED unit 59 executes the program 58p to receive the instruction from the inspection device 61 (such as an instruction of performing the first display inspection process or the second display inspection process, i.e. a display control signal) through the interface 56 from the input terminal 51b and transmit the instruction to the drive circuit portion 53.

Upon receiving, for example, an instruction to execute the second display inspection process, the drive circuit portion 53 performs a control such that electric power is sequentially supplied to all the LEDs 5a included in the LED display portion 54 one by one in the order in which the LEDs 5a are arrayed. Further, for example, when the inspection device 61 sequentially instructs execution of the first display inspection process and the second display inspection process in this order, the CPU 58 first instructs the drive circuit portion 53 to perform the first display inspection process, and subsequent to the end of the first display inspection process, instructs the drive circuit portion 53 to perform the second display inspection process.

When the server 10 is connected to the MFP 1, the CPU 58 instructs the drive circuit portion 53 to perform an instruction indicated by a display control signal transmitted from the server control unit 11 through the interface 55 and is received by the input terminal 51a, such as a display of a progress state display image, irrespective of whether or not the inspection device 61 is connected to the interface 56.

In a structure in which the inspection device 61 is connectable to the LED unit 59 as described above, the LED unit 59 does not need to secure a storage region in the storage portion for storing a program having a large data amount such as the program 61p. Further, usage of the inspection device 61 enables selection and execution of a plurality of different display inspection processes. This helps to perform various kinds of inspections of the LED unit 59.

Description is given above of an example of a structure in which the LED unit 59 includes two interfaces 55 and 56 that are independent from each other, but the present embodiment is not limited to this. For example, when the inspection device 61 is compatible with the interface 55 for the server control unit 11, a structure including a single interface 55 is possible.

In this structure, the inspection device 61 is connected to the interface 55 in the manufacturing factory, and when the server 10 is connected to the MFP 1 after the MFP 1 is shipped from the manufacturing factory and is installed into the user's office, the signal cable 11a, which extends from the server control unit 11, is connected to the interface 55.

Embodiment 4

In Embodiment 1 described above, description is given of an example of a structure in which electric power is supplied from the power supply unit 7 to the LED unit 5 when the MFP 1 transitions to the LED inspection mode, irrespective of an operation state of the MFP 1, e.g. printing or standing by in the normal mode, or during transition to the power-saving mode.

Embodiment 4 differs from Embodiment 1 in that, in a structure in which components of the MFP 1 such as the scanning unit 2a, the printing unit 2b, the authentication unit 4, the LED unit 5, and the overall control unit 6 share the power supply unit 7 of the MFP 1 as a single power supply unit, determination of whether or not electric power supplied from the power supply unit 7 to the LED unit 5 is restricted is performed in accordance with the operation state of the MFP 1 during the LED inspection mode.

This power supply restriction is achieved by supplying, from the power supply unit 7 to the LED unit 5, a smaller electric power amount than when no restriction is performed. How the power supply restriction is performed is described later. Such a power supply restriction is performed due to the following reasons.

The power supply unit 7 of the MFP 1 supplies electric power not only to the LED unit 5 but also to the scanning unit 2a and the printing unit 2b. As described above, the lamp 2c of the scanning unit 2a and the heater 84c of the printing unit 2b consume a significant electric power amount.

In contrast, in the LED unit 5, the greater the number of the LEDs 5a that are lit, the larger electric power amount that the LED unit 5 consumes, although the electric power amount consumed by each of the LEDs 5a is small. Further, in the LED unit 5, large current variance occurs when switching from the all-on state to the all-off state.

For example, when not only the inspection of the LED unit 5 but also the inspections of the scanning function and the printing function are simultaneously performed in inspection processes in the manufacturing factory of the MFP 1, a large electric power amount needs to be supplied from the power supply unit 7 to the scanning unit 2a and to the printing unit 2b in addition to the LED unit 5. The power supply unit 7 typically has a capacity for achieving stable electric power supply within a range equal to or less than a rated electric power consumption by the MFP 1 (for example, 1.5 kW). However, when a total electric power amount consumed by components such as the scanning unit 2a and the printing unit 2b is large and electric power is supplied also to the LED unit 5, a phenomenon such as output electric power (total value of electric power supplied to components of the MFP 1) of the power supply unit 7 temporarily exceeding the rated electric power consumption of the MFP 1 or rapid and large variance of the current that is output from the power supply unit 7 occurs, and therefore decline and/or instantaneous interruption of voltage may occur.

In view of this, the present embodiment restricts supply of electric power from the power supply unit 7 to the LED unit 5 according to requirements in accordance with operation states of the MFP 1, in order to help to suppress the load of the power supply unit 7 as much as possible and prevent occurrence of decline and/or instantaneous interruption of voltage.

FIG. 14 is a diagram of how whether or not supply of electric power to the LED unit 5 is restricted is switched in accordance with operation states of the MFP 1.

In FIG. 14, the "MFP operation" row indicates the current operation state of the MFP 1, and five states "Starting up (warming up)", "Standing by", "Printing", "Power-saving", and "Restoring" are given as examples. "Starting up (warming up)" is hereinafter abbreviated as "Warming up".

"Warming up" indicates an operation that is started upon switching of the power supply switch 21 from off to on and that heats the fixing roller 84a by turning on the heater 84c of the fixing unit 84 and increasing the surface temperature of the fixing roller 84a to the fixing temperature. When the surface temperature of the fixing roller 84a reaches the fixing temperature, the warming-up operation ends and the MFP 1 is ready for performing printing.

"Standing by" indicates a state in which, after the end of the warming-up operation, a maintenance control is performed and no job such as printing and scanning is performed. The maintenance control refers to an operation of alternating turning on and turning off the heater 84c such that the surface temperature of the fixing roller 84a is maintained at the fixing temperature. In this standby state, the surface temperature of fixing roller 84a is maintained at the fixing temperature, and printing can be started as soon as an instruction to perform printing is received.

When warming up, electric power supplied from the power supply unit 7 to the heater 84c per unit time is increased as much as possible in order to shorten as much as possible a time period required for the surface temperature of the fixing roller 84a to reach the fixing temperature (warm-up period). Such a change of supplied electric power is achieved by, for example, controlling a cycle of a time period during which a switching element (not illustrated) of the power supply unit 7 is on and a time period during which the switching element is off (duty cycle).

In contrast, in the standby state, only maintaining the fixing roller 84a after temperature increase at the fixing temperature is sufficient, and therefore the electric power amount supplied from the power supply unit 7 to the heater 84c does not have to be large. Accordingly, the electric power amount that is output from the power supply unit 7 is much larger when warming up than when standing by.

"Printing" indicates that a printing operation is being performed. When printing, electric power from the power supply unit 7 is supplied not only to the heater 84c but also to components such as the photoreceptor drum 85 and the intermediate transfer belt 82 that are necessary for the printing operation during processes such as electricity charging, light exposure, developing, and transferring. Accordingly, the electric power amount that is output from the power supply unit 7 is larger when printing than when warming up.

"Power-saving" indicates a state in which the electric power amount consumed by the MFP 1 is made smaller than in the standby state in order to achieve energy saving. For example, the heater 84c is controlled such that the surface temperature of the fixing roller 84a is maintained at a power-saving temperature (for example, about 100° C.) that is much lower than the fixing temperature. In the power-saving state, printing cannot be performed.

Here, when an input operation of the power-saving button (not illustrated) on the operation display unit 3 by the user is received during the standby state, the MFP 1 transitions to the power-saving state. Further, the MFP 1 may automatically transition to the power-saving state when no instruction from the user such as an instruction of performing a job such as printing or scanning or input on the operation display unit 3 is received for a defined time period in the standby state.

"Restoring" indicates restoring from the power-saving state to the standby state. Here, in a manner similar to when warming up, an operation of increasing the surface temperature of the fixing roller 84a to the fixing temperature by turning on the heater 84c is performed. In order to perform a temperature increase operation of the fixing roller 84a, a large electric power amount supplied from the power supply unit 7 to the heater 84c is required.

The restoring operation is started upon user input of a restoring button (not illustrated) on the operation display unit 3 in the power-saving state. Further, the restoring operation may automatically be started when a certain instruction such as a job performing instruction and/or input on the operation display unit 3 is received from the user in the power-saving state.

When the surface temperature of the fixing roller 84a reaches the fixing temperature, the restoring operation ends. If the restoring operation is started upon input of the restoring button, the MFP 1 transitions to the standby state when the restoring operation ends. If the restoring operation is started by a job performing instruction, the job is started at the same time as when the MFP 1 transitions to the standby state due to the end of the restoring operation.

The "MFP electric power consumption" row indicates electric power amounts consumed when warming up, when standing by, when printing, and when power-saving in three levels (large, medium, and small), and equals electric power amounts that are output from the power supply unit 7. Here, the power supply unit 7 acquires information indicating the current operation state of the MFP 1 from the overall control unit 6 at intervals and outputs defined electric power in accordance with the acquired operation state of the MFP 1. When warming up, when printing, and when restoring, a significant electric power amount is consumed; in the power-saving state, a small electric power amount is consumed; and in the standby state, a medium electric power amount is consumed.

The "Restriction of electric power supplied to LED unit" row indicates whether or not supply of electric power is restricted during each of the MFP operations. Specifically, in "Warming up", "Printing", and "Restoring", the MFP electric power consumption is large, and therefore electric power that is output from the power supply unit 7 may exceed a power supply capacity (rated electric power consumption) of the power supply unit 7 when electric power is supplied to the LED unit 5 simultaneously. Accordingly, "Restriction of electric power supplied to LED unit 5" indicates "Yes" in the items corresponding to "Warming up", "Printing", and "Restoring".

In "Power-saving", the MFP electric power consumption is the smallest, and therefore the power supply unit 7 has a capacity that can be spared for supply of electric power to the LED unit 5. However, an upper limit of electric power that is output from the power supply unit 7 is defined at a small value for the purpose of power-saving. Accordingly, the power supply unit 7 cannot spare electric power for the LED unit 5, and therefore the "Restriction of power supply to LED unit 5" item indicates "Yes".

In "Standing by", the MFP electric power consumption is medium, and electric power that is output from the power supply unit 7 is below the rated electric power consumption of the MFP 1 even when electric power is supplied to the LED unit 5 simultaneously. Accordingly, the "Restriction of power supply to the LED unit 5" item indicates "No".

Whether the "Restriction of power supply to the LED unit 5" items each corresponding to a different one of the MFP operations indicate "Yes" or "No" in FIG. 14 is defined based on experiments or the like from electric power consumption of each of the MFP operations and the power supply capacity of the power supply unit 7, such that the electric power amount that is output from the power supply unit 7 is equal to the upper limit or smaller, i.e. within the range of the power supply capacity of the power supply unit 7.

For example, where the upper limit of the power supply capacity of the power supply unit 7 is the same as the rated electric power consumption Pw, maximum electric power consumption by the LED unit 5 when all the LEDs 5a are lit is Pz, and electric power consumption by the components of the MFP 1 other than the LED unit 5 (including the heater 84c) is Pv, electric power that is output from the power supply unit 7 would not exceed the rated electric power consumption even when electric power is supplied to the LED unit 5 if a total of Pv and Pz (=Pv+Pz) is equal to Pw or less.

In "Warming up", "Printing", and "Restoring", a significant electric power amount is supplied to the heater 84c, and it is known in advance that (Pv+Pz)>Pw. Accordingly, the "Restriction of power supply to the LED unit 5" item indicates "Yes". When electric power supplied to the LED unit 5 is reduced to Pz1 due to such a power supply restriction, light amounts (luminance) of the LEDs 5a decreases in accordance with the decrease of electric power supplied to the LED unit 5. However, if (Pv+Pz1)≤Pw, the LED unit 5 can perform a display of images within the range of the power supply capacity of the power supply unit 7, without affecting the warming-up operation, the printing operation, and the like.

In contrast, in "Standing by", the electric power amount supplied to the heater 84c is much smaller than in "Warming up", "Printing", and "Restoring". Accordingly, (Pv+Pz)≤Pw is satisfied, and therefore the power supply restriction item indicates "No".

When a time period during which the warming-up operation, the printing operation, or the restoring operation is performed is referred to as a first period and a time period during which the MFP 1 is in the standby state is referred to as a second period, electric power supplied to the LED unit 5 is restricted during the first period, and is not restricted during the second period.

Figure 15:
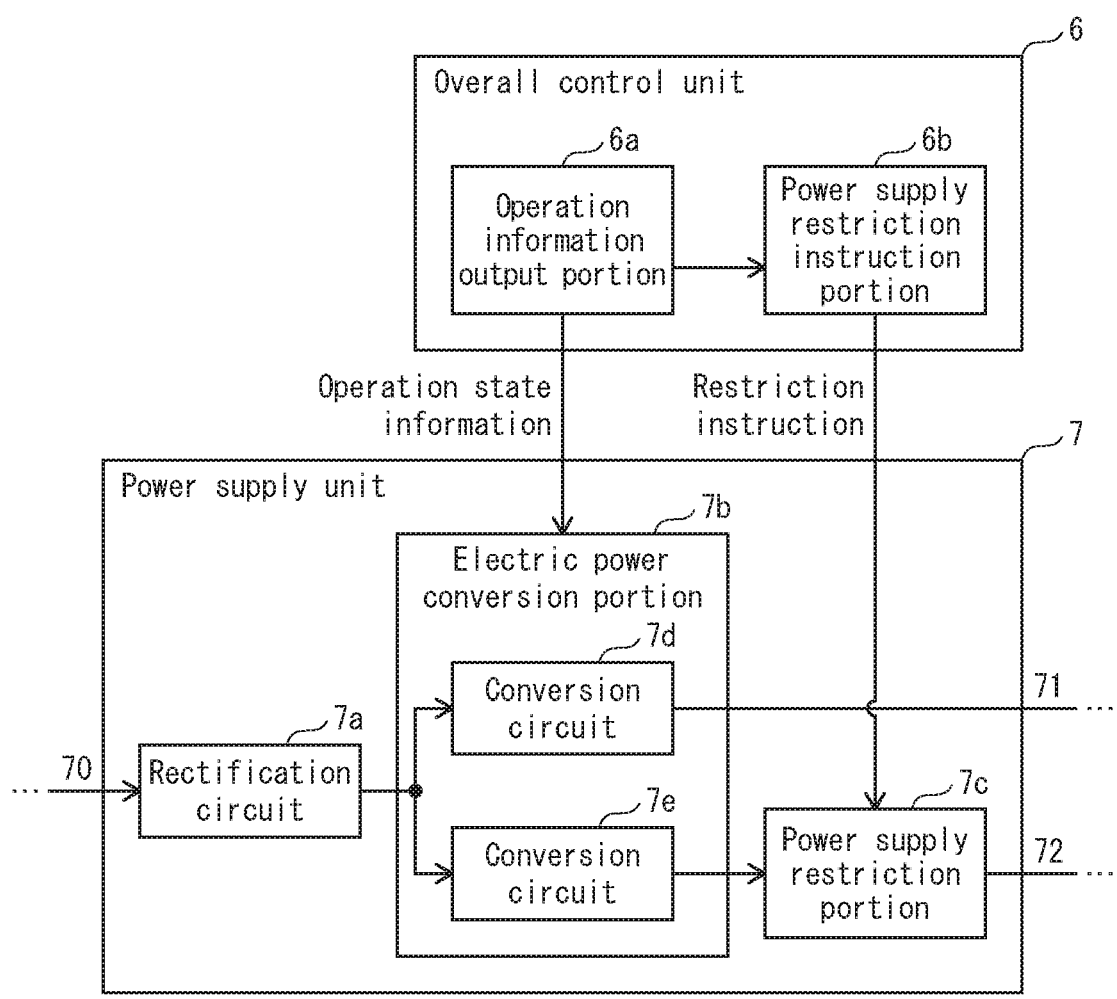
FIG. 15 is a block diagram of a structure of an overall control unit and a power supply unit pertaining to Embodiment 4.

FIG. 15 is a block diagram of a structure of the overall control unit 6 and the power supply unit 7 pertaining to Embodiment 4. Here, portions other than the overall control unit 6 and the power supply unit 7 are not illustrated.

In FIG. 15, the overall control unit 6 includes an operation information output portion 6a and a power supply restriction instruction portion 6b. The operation information output portion 6a outputs operation state information indicating the current operation state of the MFP 1 to the power supply unit 7. When a power supply restriction instruction to the LED unit 5 is required, the power supply restriction instruction portion 6b outputs the power supply restriction instruction in accordance with the current operation state. Here, the power supply restriction instruction is output when the operation state is other than "Standing by", and the power supply restriction instruction is not output when the operation state is "Standing by".

The power supply unit 7 includes a rectification circuit 7a, an electric power conversion portion 7b, and a power supply restriction portion 7c.

The rectification circuit 7a converts a commercial power supply voltage (AC) that is input to the input terminal 70 to a direct voltage.

The electric power conversion portion 7b includes conversion circuits 7d and 7e.

The conversion circuit 7d converts, with use of the control of the duty cycle described above or the like, electric power after rectification by the rectification circuit 7a to electric power that is suitable for supply to the scanning unit 2a, the printing unit 2b, or the like in accordance with the current operation state of the MFP 1. The conversion circuit 7e converts the electric power after rectification into electric power that is suitable for the LED unit 5. The electric power that is output from the conversion circuit 7d is supplied from the output terminal 71 to components such as the printing unit 2b. The electric power that is output from the conversion circuit 7e is supplied through the power supply restriction portion 7c from the output terminal 72 to the LED unit 5.

The power supply restriction portion 7c includes a circuit that can change a restriction value (upper limit value) of a current that is output to the LED unit 5. When no power supply restriction instruction from the power supply restriction instruction portion 6b is received, the power supply restriction portion 7c causes electric power that is output from the conversion circuit 7e to be output from the output terminal 72 without performing the power supply restriction; when a power supply restriction instruction is received, the power supply restriction portion 7c restricts electric power that is output from the conversion circuit 7e and causes the restricted electric power to be output from the output terminal 72. This power supply restriction is performed such that (Pv+Pz1)≤Pw.

Such a power supply restriction enables electric power that is output from the power supply unit 7 (electric power that is a sum of electric power output from the output terminal 71 and electric power output from the output terminal 72) to be within the range of the power supply capacity of the power supply unit 7. However, current that is output from the output terminal 72, i.e. current supplied from the power supply unit 7 to the LED unit 5, is reduced to a restriction value that is smaller than when no power supply restriction is performed. Accordingly, the electric power amount supplied to the LEDs 5a becomes smaller, and luminance of the LEDs 5a becomes less accordingly as described above.

The power supply restriction by the power supply restriction portion 7c restricts supply of electric power to the LED unit 5, and does not restrict supply of electric power from the conversion circuit 7d to components such as the printing unit 2b. Accordingly, the power supply restriction by the power supply restriction portion 7c does not affect operations such as the print job.

When (Pv+Pz1)≤Pw is not satisfied even though the power supply restriction is performed, operations such as printing or the LED inspection can be terminated forcibly.

Figure 16:
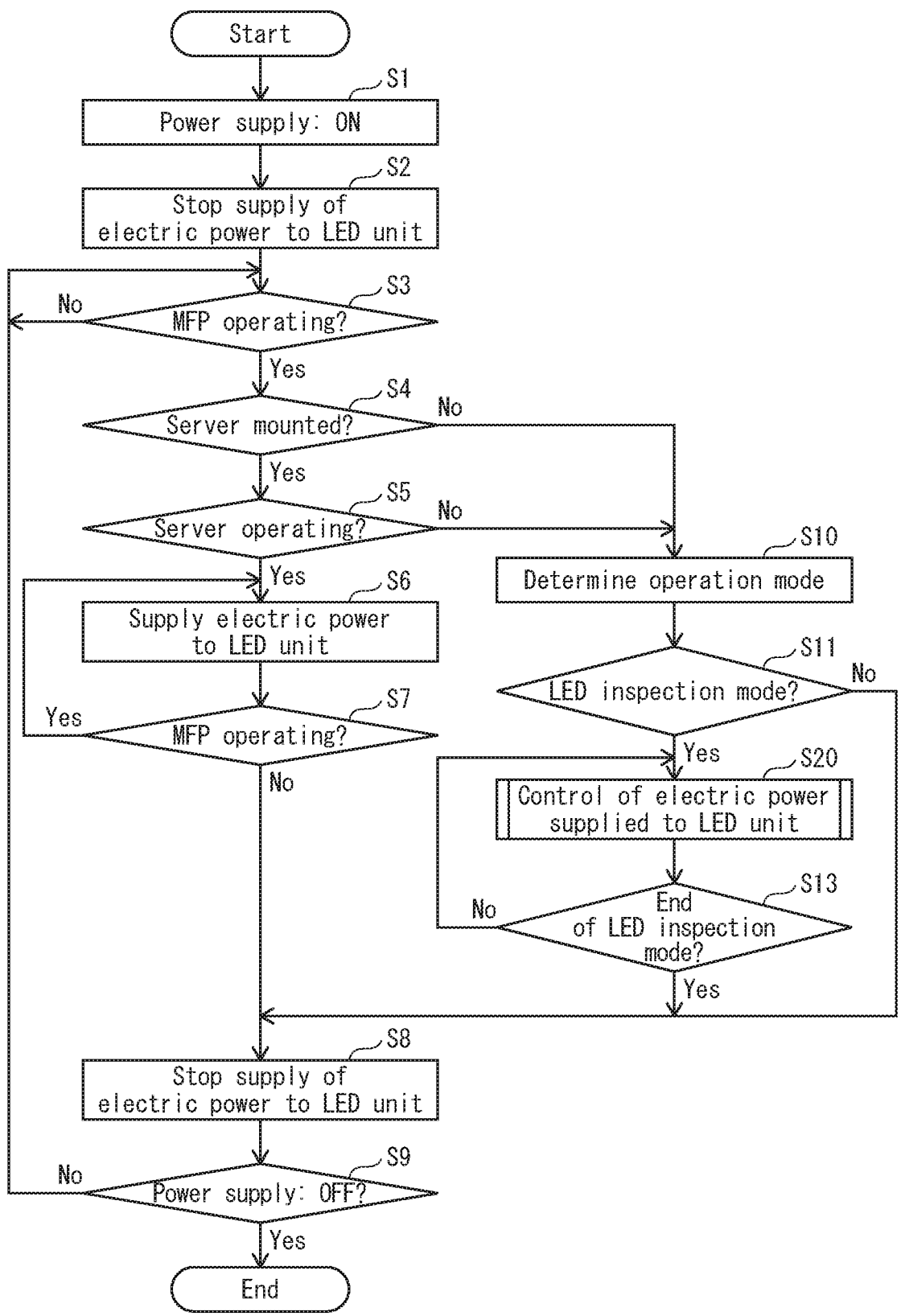
FIG. 16 is a flowchart in which a power supply restriction is incorporated into the switching control of supply and stoppage of electric power from the power supply unit to the LED unit.

FIG. 16 is a flowchart in which a power supply restriction is incorporated into the switching control of supply and stoppage of electric power supplied to the LED unit 5. The flowchart in FIG. 16 differs from the flowchart in FIG. 10 in that a control of electric power supplied to the LED unit 5 (step S20) is performed instead of step S12 in the flowchart in FIG. 10.

Figure 17:
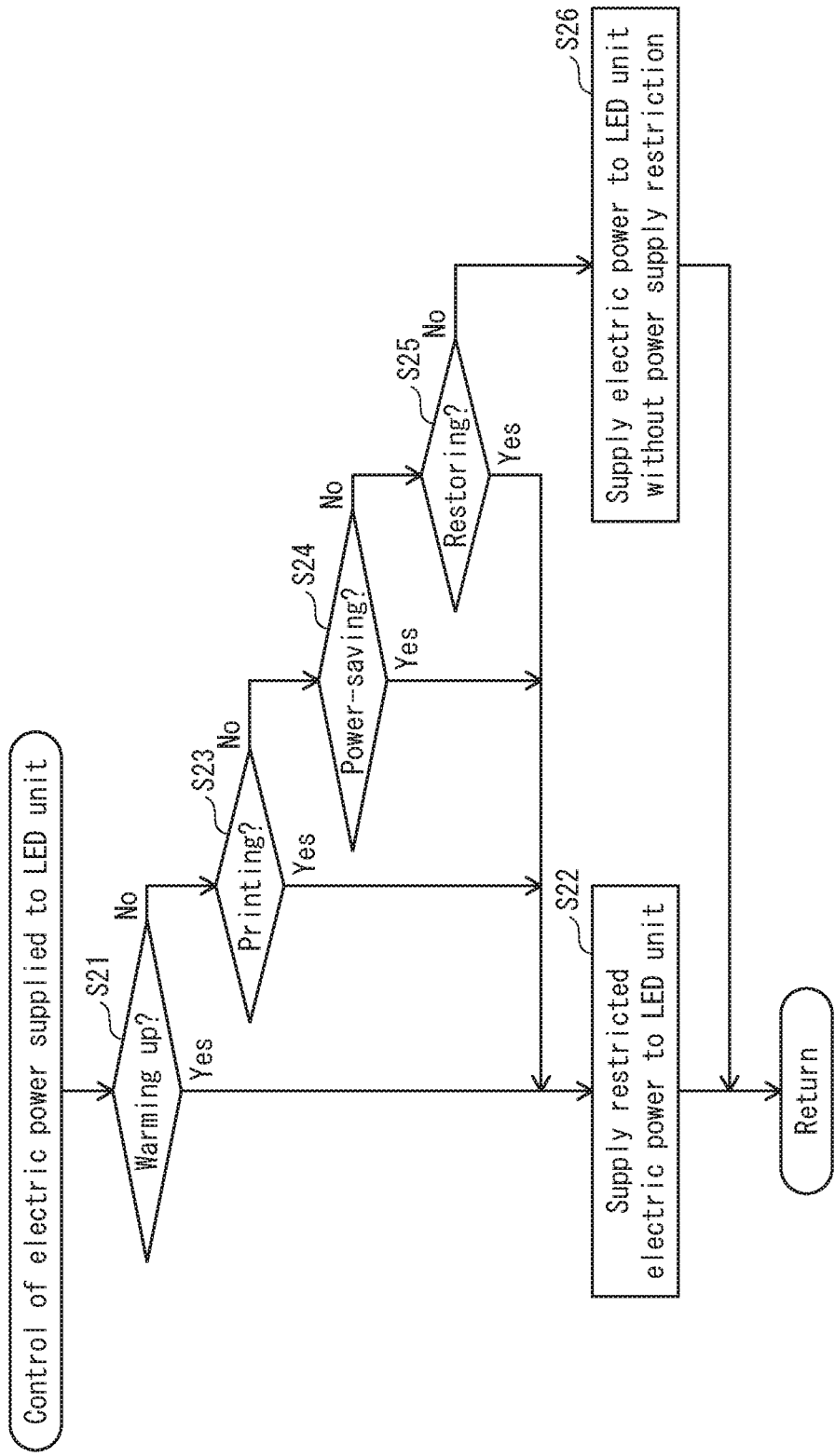
FIG. 17 is a diagram of a subroutine of a control of electric power supplied to the LED unit.

FIG. 17 is a diagram of a subroutine of the control of electric power supplied to the LED unit 5 (step S20).

As illustrated in FIG. 17, determination of whether or not the current operation state of the MFP 1 is "Warming up" is performed (step S21). When determining that the MFP 1 is warming up (first period) ("Yes" in step S21), restricted electric power is supplied to the LED unit 5 (step S22), and the process returns.

When determining that the MFP 1 is not warming up ("No" in step S21) but is printing (first period) ("Yes" in step S23), the process advances to step S22.

When determining that the MFP 1 is not printing ("No" in step S23) but is power-saving ("Yes" in step S24), the process advances to step S22.

When the MFP 1 is not power-saving ("No" in step S24) but is restoring from the power-saving state (first period) ("Yes" in step S25), the process advances to step S22.

When determining that the MFP 1 is not restoring ("No" in step S25), it is determined that the MFP 1 is standing by (second period). Electric power is supplied to the LED unit 5 without a power supply restriction (step S26), and the process returns.

By switching performing and not performing the power supply restriction in accordance with operation states of the MFP 1 as described above, occurrence of decline and/or instantaneous interruption of voltage is helped to be prevented even when a display operation of the LED unit 5 for inspection of the LED unit 5 is performed and inspection processes of components such as the printing unit 2b are performed simultaneously in the inspection processes in the manufacturing factory.

Embodiment 5

In Embodiment 4 above, description is given of an example of a structure in which electric power supplied to the LED unit 5 is restricted according to requirements in accordance with the operation state of the MFP 1 when performing the LED inspection mode. Embodiment 5 differs from Embodiment 4 in that restriction of electric power supplied to the LED unit 5 is not performed when the LED inspection mode is performed but is performed after the MFP 1 is installed into the user's office or the like, when the server 10 is connected to the MFP 1 and operations such as a print job is performed.

For example, in the MFP 1, displaying a progress state display image of uploading to the cloud service on the LED unit 5 simultaneously with a print job is a load for the power supply unit 7 in a manner similar to Embodiment 4 described above, and this may give rise to decline and/or instantaneous interruption of voltage.

Further, when the power supply plug 91 of the MFP 1 and the power supply plug 92 of the server 10 share the same external commercial power supply and the electric power amount that is output from the power supply unit 7 of the MFP 1 becomes excessively large, electric power that is output from the power supply unit 7 may exceed the power supply capacity of the commercial power supply and electric power supplied from the commercial power supply may be shut off.

In view of this, the present embodiment aims to prevent occurrence of decline and/or instantaneous interruption of voltage by restricting electric power supplied to the LED unit 5 when, for example, performing an ordinary print job.

Instead of the structure of Embodiment 4 in which a restriction of electric power supplied to the LED unit 5 is achieved by causing the power supply unit 7 of the MFP 1 to supply a smaller electric power amount, Embodiment 5 adopts a structure in which the server 10 performs a power supply restriction independently from the MFP 1. Specifically, the server control unit 11 does not instruct the LED unit 5 to display a progress state display image during a time period in which the power supply restriction needs to be performed, such as when performing a print job; the server control unit 11 instructs the LED unit 5 to display the progress state display image after an elapse of such a time period (after the end of the print job).

Figure 18:
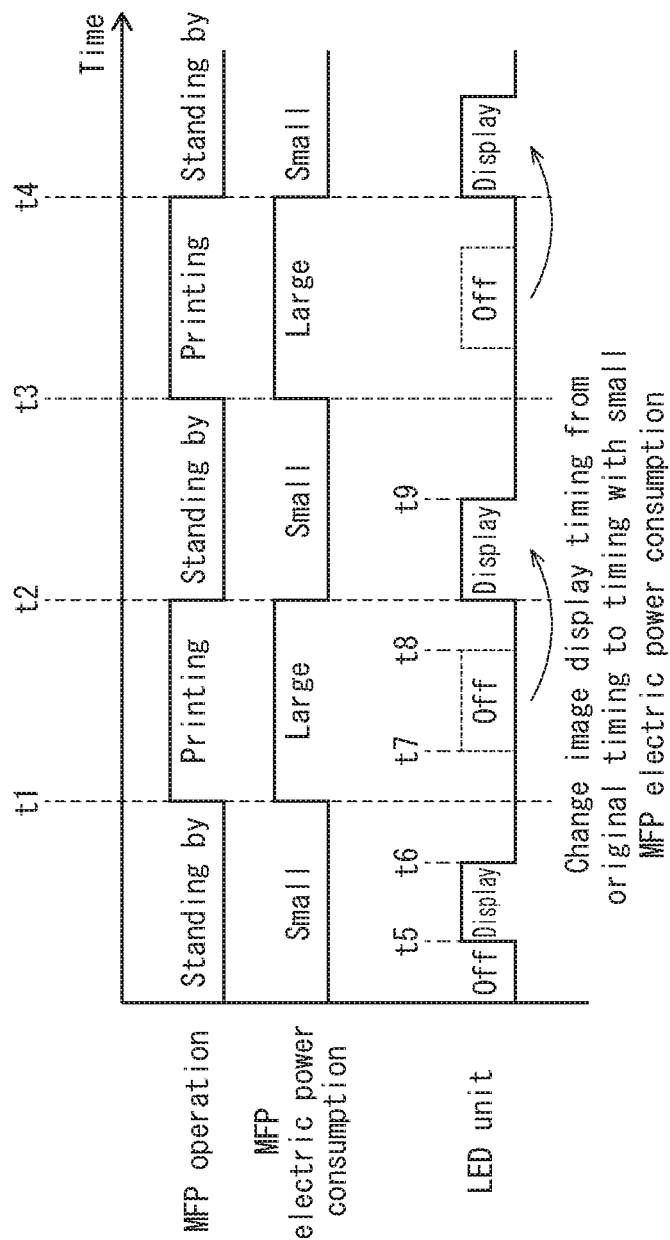
FIG. 18 is a diagram of how a time point at which a progress state display image is displayed on the LED unit is shifted from during executing a print job to after an end of the print job in Embodiment 5.

Specifically, taking when standing by and when printing as examples, in FIG. 18, no power supply restriction has to be performed during the standby state because the MFP electric power consumption is smaller when in the standby state than when printing. Accordingly, the server control unit 11 instructs the LED unit 5 to display the progress state display image during a time period in which uploading is performed (time period from the time point t5 to the time point t6), and therefore the progress state display image is displayed on the LED unit 5.

In contrast, the power supply restriction needs to be performed during a time period from the time point t1 to the time point t2 in which the print job is performed because the MFP electric power consumption is larger during the time period from the time point t1 to the time point t2 than during the standby state. Accordingly, even during a time period in which uploading is performed (time period from the time point t7 to the time point t8), the server control unit 11 does not instruct the LED unit 5 to display the progress state display image during a time period in which the print job is performed (time period from the time point t1 to the time point t2). Due to this, the progress state display image is not displayed on the LED unit 5 when the print job is performed.

When the print job ends and the MFP 1 transitions to the standby state (the time point t2), the power supply restriction is no longer required, and the server control unit 11 instructs the LED unit 5 to display the progress state display image that is supposed to be displayed during the time period in which the preceding print job has been performed (release of the power supply restriction). Due to this, the progress state display image is displayed on the LED unit 5 during a time period after transition to the standby state (time period from the time point t2 to the time point t9), delaying from an original display timing of the progress state display image (time period from the time point t7 to the time point t8). Note that an image illustrating a progress state at the current time point is displayed when the uploading is in progress at the time point t2; when the uploading has already ended at the time point t2, an image indicating the end of the uploading is displayed.

As described above, when the power supply restriction is performed, the time point at which the progress state display image is displayed (hereinafter referred to as "image display timing") is delayed until the power supply restriction is released. This similarly applies to a time period from a time point t3 to a time point t4 during which another print job is performed.

Shifting of the image display timing is controlled by the server control unit 11. Specifically, the server control unit 11 acquires the current operation state of the MFP 1 (e.g. "Printing", "Standing by", or the like) from the overall control unit 6 of the MFP 1 at intervals and recognizes the current operation state of the MFP 1.

Further, when the server 10 is performing an operation such as uploading to the cloud service and the MFP 1 is, for example, standing by, the server control unit 11 instructs the LED unit 5 to display the progress state display image. In contrast, when the MFP 1 is, for example, performing a print job, the server control unit 11 does not instruct the LED unit 5 to display the progress state display image during the print job; the server control unit 11 waits until the time point at which the print job ends and the MFP 1 transitions to the standby state and then the server control unit 11 instructs the LED unit 5 to display the progress state display image.

In order to perform such a control of shifting the image display timing, the server control unit 11 needs to acquire a current operation state, specifically, the current operation state of the printing unit 2b (second device), from the MFP 1 at intervals.

Figure 19:
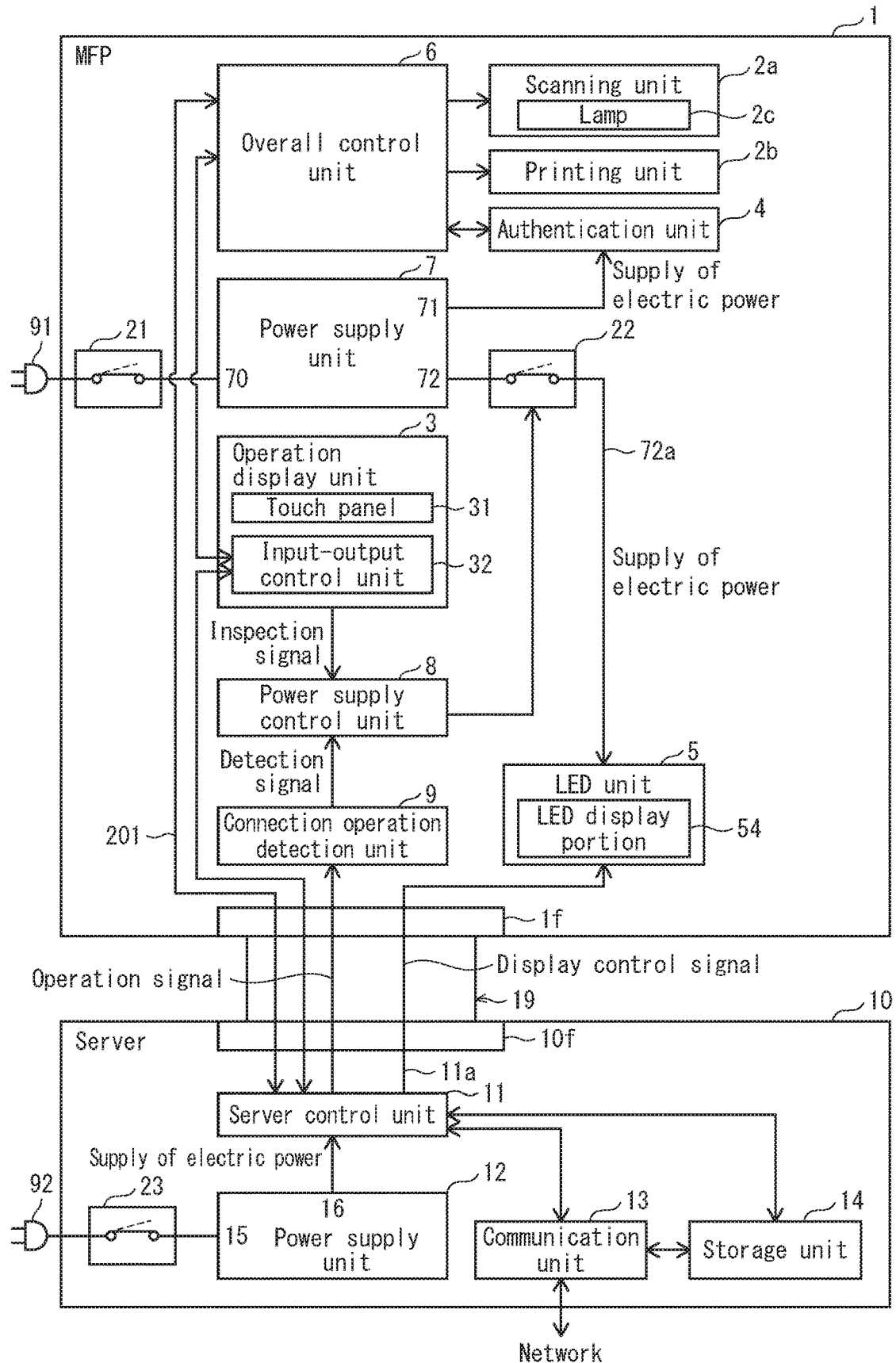
FIG. 19 is a control block diagram of an MFP and a server pertaining to Embodiment 5.

In view of this, Embodiment 5 adopts a structure in which, as illustrated in FIG. 19, the overall control unit 6 of the MFP 1 and the server control unit 11 are connected through a signal cable 201 and the overall control unit 6 transmits, to the server control unit 11, device operation information indicating a current operation state of the printing unit 2b of the MFP 1 (for example, "Printing", "Stopped (i.e. "Standing by")", or the like).

Note that how much electric power is consumed by the MFP 1 when performing printing and when standing by is typically calculatable in advance through experiments. Accordingly, the operation states of the MFP 1 may be substituted by electric power consumption values. For example, by storing in advance a table 211 as in FIG. 20 in which "Standing by" is associated with electric power consumption value P1 and "Printing" is associated with electric power consumption value P2 (>P1) in the overall control unit 6 of the MFP 1, the overall control unit 6 can determine the current electric power consumption value of the MFP 1 on the basis of the current operation state of the MFP 1. Electric power consumption values P1 and P2 may each indicate, for example, an average value or a maximum value (peak).

The following describes an example of a structure in which the overall control unit 6 transmits, to the server control unit 11, electric power consumption corresponding to the operation state of the MFP 1 as current electric power consumption information of the MFP 1 and the server control unit 11 performs the display control of the LED unit 5 in accordance with the electric power consumption information of the MFP 1.

Figure 21:
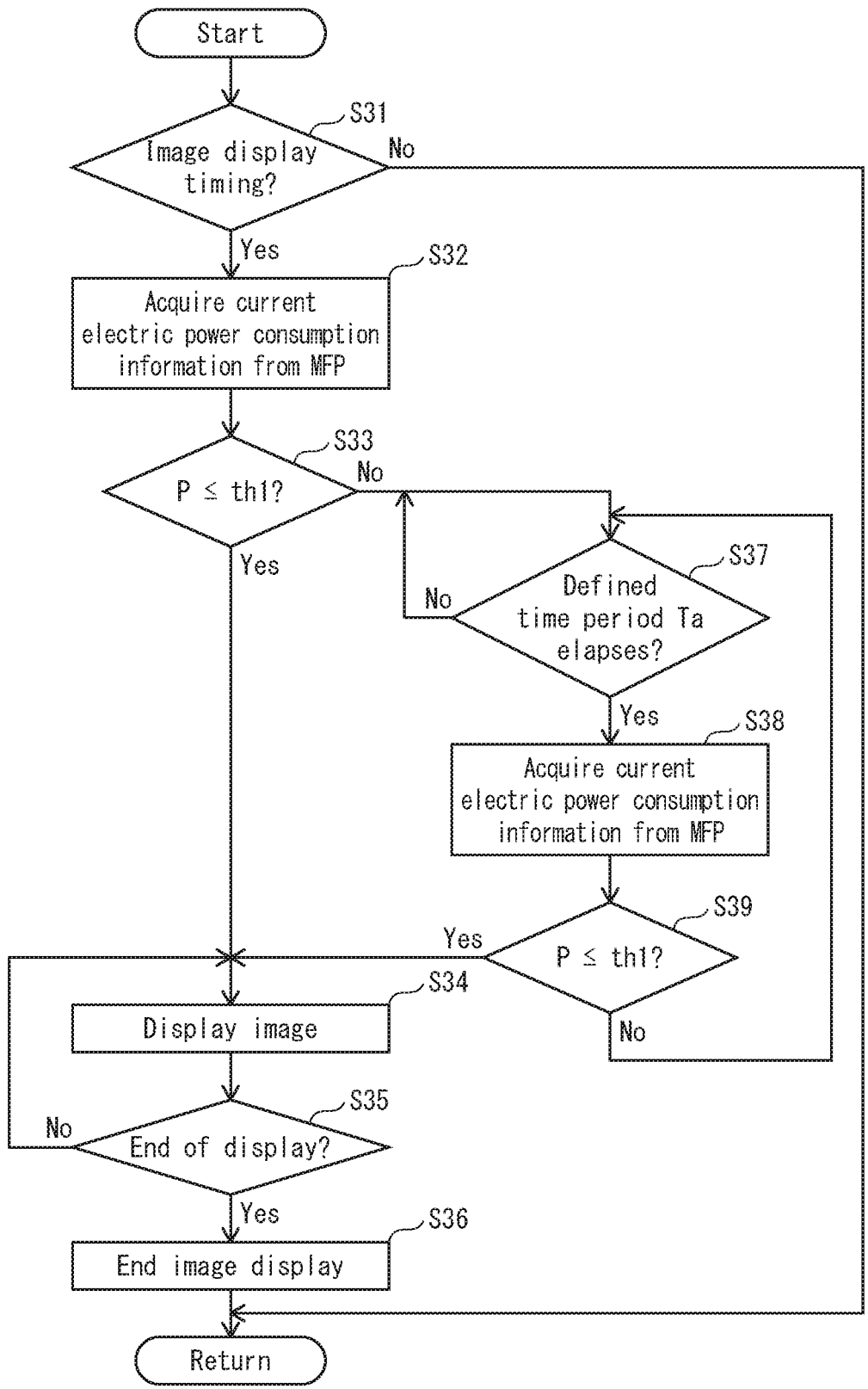
FIG. 21 is a flowchart of a display control by a server control unit.

FIG. 21 is a flowchart of the display control by the server control unit 11, and this display control is performed repeatedly by being called at defined intervals by a main routine that is not illustrated.

As illustrated in FIG. 21, the server control unit 11 determines whether or not the current time point is an image display timing by the cloud service (step S31). The server control unit 11 receives progress state information (information indicating the ratio Z described above) from the communication unit 13 during a time period in which the cloud service is performed, and performs the determination of step S31 each time the received ratio Z reaches a defined value.

When the server control unit 11 determines that the current time point is the image display timing ("Yes" in step S31), the server control unit 11 acquire the current electric power consumption information from the overall control unit 6 of the MFP 1 (step S32).

Then, the server control unit 11 determines whether or not an electric power consumption value P that the acquired electric power consumption information indicates is equal to or smaller than a threshold value th1 (step S33). Here, the threshold value th1 is a threshold value for determining whether or not a restriction of electric power supplied to the LED unit 5 is performed. The threshold value th1 is determined in advance through experiments as a value at which voltage decline or the like may occur due to, for example, electric power consumption by the MFP 1 exceeding the rated electric power consumption of the power supply unit 7 in cases in which, for example, the electric power consumption value P exceeds the threshold value th1 and normal (unrestricted) electric power is further supplied to the LED unit 5. Here, P1<th1<P2 is satisfied where electric power consumption when standing by is referred to as P1 and electric power consumption when performing a print job is referred to as P2.

When the server control unit 11 determines that P≤th1 is satisfied ("Yes" in step S33), the server control unit 11 instructs the LED unit 5 to display a progress state display image in accordance with the progress state information (step S34). This corresponds to a case in which the MFP 1 is, for example, standing by. Here, the progress state display image is displayed at the original image display timing, and therefore this is a case in which no power supply restriction is performed.

When the server control unit 11 determines that P≤th1 is not satisfied ("No" in step S33), the server control unit 11 acquires the current electric power consumption information again from the overall control unit 6 of the MFP 1 (step S38) after an elapse of a defined time period Ta ("Yes" in step S37).

The server control unit 11 then determines whether or not the electric power consumption value P indicated by the newly acquired current electric power consumption information is equal to or smaller than the threshold value th1 (step S39). When the server control unit 11 determines that P≤th1 is not satisfied ("No" in step S39), the server control unit 11 returns to step S37. Processes from step S37 to step S39 are repeatedly performed until the server control unit 11 determines that P≤th1 is satisfied. This corresponds to, for example, when a print job is being performed.

When the server control unit 11 determines that P≤th1 is satisfied ("Yes" step S39), the server control unit 11 progresses to step S34. This corresponds to a case in which the MFP 1 has transitioned to the standby state after the end of the print job.

In step S34, when downloading or the like is still in progress at the current time point, the server control unit 11 instructs the LED unit 5 to display a progress state display image in accordance with the progress state information. When downloading or the like has already ended, the server control unit 11 instructs the LED unit 5 to display an image indicating that downloading or the like has already ended. In both of these cases, the image display is delayed from a time period during which the print job is being performed, which includes the original image display timing, to a time period after the end of the print job. Thus, these cases are regarded as cases in which the power supply restriction is performed.

When the server control unit 11 determines that a time point for ending the display of the progress state display image has come ("Yes" in step S35), the server control unit 11 instructs the LED unit 5 to end the display of the progress state display image (step S36), and the server control unit 11 returns.

By performing a control of shifting the image display timing as described above, the progress state display image can be displayed after the end of the print job. This helps to suppress an amount and variance of electric power that is output from the power supply unit 7 to a greater extent than cases in which the progress state display image is displayed simultaneously when the print job is being performed.

That is, in cases in which the progress state display image is displayed simultaneously when the print job is being performed, the power supply unit 7 needs to output a large electric power amount (for example, P4) that is a sum of the electric power consumption P2 required for printing and the electric power amount (for example, P3) required for a display of the progress state display image. Further, in cases in which uploading starts and ends within a time period from the start to the end of the print job, large electric power variance occurs such that electric power output increases from P2 to P4 and then decreases to P2.

In contrast, if a control of shifting the display timing is performed, the power supply unit 7 only needs to output electric power P2 when the print job is being performed and to output electric power P3 when the progress state display image is displayed after the end of the print job. The power supply unit 7 does not have to output a large electric power amount P4 (=P2+P3) when the print job is being performed and electric power would not vary to a great extent when the print job is being performed, and therefore the load of the power supply unit 7 is smaller and occurrence of voltage decline or the like described above is helped to be prevented.

This control of shifting the display timing is substantially the same as controlling such that the electric power amount supplied from the power supply unit 7 to the LED unit 5 is smaller when printing operations are performed by the printing unit 2b than when the printing operations are not performed. That is, this control is substantially the same as restricting electric power supplied to the LED unit 5 when performing printing. Due to this, the restriction of electric power supplied to the LED unit 5 can be performed also by the server 10.

In the above description, the image display timing is shifted to a time point after the end of printing, but the present embodiment is not limited to this. A structure in which the image display period and the printing operation period do not overlap with each other, i.e. a structure in which the image display and printing are performed at different time points, is sufficient. For example, when a time point at which the print job starts and a time point at which the image display starts are substantially the same, a control may be performed such that the image display is performed first and the print job is started after the end of the image display.

Further, description is given of an example of a structure in which the server 10 performs the control of shifting the time point at which an image is displayed on the LED unit 5, but the present embodiment is not limited to this.

For example, in cases in which downloading starts and ends within a time period from a start to an end of a print job and the image display timing is shifted to a time point after the end of the print job, downloading has already ended at the time point when the progress state display image is displayed. If the user wishes to check the downloaded file as soon as possible, checking of the downloaded file is delayed by a time period that is equal to a time period from the original image display timing and the image display timing after shifting.

In such cases, the power supply restriction may be achieved with the progress state display image being displayed when the print job is being performed by performing a control other than shifting the image display timing to a time point after the end of the print job. For example, a structure in which a control of causing luminance of the LEDs 5a to be less than when no print job is being performed (normal period) or a display region in the LED display portion 54 to be smaller than when in the normal period is performed such that electric power that is output from the power supply unit 7 does not exceed the upper limit (such as the rated electric power consumption) is possible.

Reduction of the luminance of the LEDs 5a can be achieved by adopting a structure in which, for example, the server control unit 11 outputs, in addition to the display control signal, a luminance signal indicating luminance (Qa in the normal period, Qb (=Qa/2) when the power supply restriction is being performed (restricted period), or the like) to the LED unit 5 and the LED unit 5 supplies current to the LEDs 5a such that the LEDs 5a are lit in luminance in accordance with the luminance signal.

When the luminance signal indicates Qb in the restricted period, through controlling such that current supplied to the LEDs 5a is half of Qa in the normal period, the supplied current amount becomes half of the current amount supplied when in the normal period and the electric power amount that is output from the power supply unit 7 becomes small accordingly. This serves as the restriction to electric power supplied to the LED unit 5.

Further, downsizing of the display region can be achieved through, for example, in a case in which N LEDs 5a are lit when no power supply restriction is performed, causing (N/2) LEDs 5a among the N LEDs 5a not to emit light such that LEDs 5a that are on and LEDs 5a that are off are arrayed alternatingly, or causing only ones of the LEDs 5a, among all the LEDs 5a in a two-dimensional array, that are arranged in an upper half or a lower half of the display region to emit light.

As described above, a control can be performed of causing the LED unit 5 to perform a display operation (such as luminance reduction or display region downsizing) such that the electric power amount supplied from the power supply unit 7 to the LED unit 5 is smaller when performing printing than when not performing printing.

In the above, the server control unit 11 performs the display control of the LED unit 5 in accordance with the electric power consumption information of the MFP 1. However, for example, the server control unit 11 may acquire, from the MFP 1, information indicating the current operation state (such as printing) of the MFP 1 instead of the electric power consumption information and performs a control of switching whether or not electric power supplied to the LED unit 5 is restricted in accordance with the acquired operation state.

Further, description is given above taking cases of performing a print job and standing by as examples of the operation states of the MFP 1. However, the present disclosure may perform a control of switching whether or not electric power is supplied to the LED unit 5 in accordance with other operation states such as warming-up, restoring, and the like.

Further, the power supply restriction may be performed when a scan job is being performed, i.e. a scanning operation of a document image by the scanning unit 2a is being performed, and the power supply restriction is not performed when no scan job is performed.

The present invention is not limited to image forming devices like the MFP 1, and may be a method of controlling supply of electric power to the LED unit 5. Further, the present invention may be a program that causes a computer to perform the method. Further, the program pertaining to the present invention may be recorded onto a non-volatile computer-readable recording medium such as, for example, a magnetic tape, a magnetic disk such as a flexible disk, an optical recording medium such as a DVD-ROM, a DVD-RAM, a CD-ROM, a CD-R, a magneto-optical disk (MO), or a phase-change disk (PD), or a flash memory recording medium, and may be produced and distributed, etc., in the form of the above recording medium, or may be transmitted and supplied in the form of the computer program via, for example, a wireless or wired network including the Internet, broadcasting, an electrical communication line, or satellite communication.

<Modifications>

The present invention has been described based on embodiments, but the present invention should not be construed as being limited to the embodiments above. For example, the following modifications are possible.

(1) In the above embodiments, inspection of the LED unit 5 is automatically performed (step S12) by starting to supply electric power to the LED unit 5 when the server 10 is not connected to the MFP 1 ("No" in step S4 or step S5 in FIG. 10) and an instruction of the LED inspection mode is received ("Yes" in S11), but the present invention should not be construed as being limited to this.

For example, a control can be performed such that supply of electric power to the LED unit 5 is started upon receiving an instruction of the LED inspection mode without detection of connection of the server 10 to the MFP 1, i.e. irrespective of whether or not the server 10 is connected to the MFP 1. This control can be achieved by adopting a structure in which the process advances to step S10 when determining that the MFP 1 is operating ("Yes" in step S3).

(2) Embodiment 1 above adopts a structure in which supply and shutting-off of electric power to the LED unit 5 is switched through switching on and off the switch 22, which is along the power supply line 72a for supplying electric power from the power supply unit 7 to the LED unit 5. However, the present invention should not be construed as being limited to this, and a structure that performs switching supply and shutting-off of electric power from the power supply unit 7 to the LED unit 5 is sufficient. For example, a structure in which the switch 22 is not provided and the power supply unit 7 outputs electric power from the output terminal 72 upon receiving, from the power supply control unit 8, an instruction of supply of electric power, and stops output of electric power from the output terminal 72 upon receiving an instruction of electric power supply stoppage is possible. Further, the power supply unit 7 should not be construed as being limited to a switching-mode power supply, and a power supply that adopts a different mode can be used.

Further, the present invention should not be construed as being limited to the structure in which the control of switching on and off the switch 22 is performed by the power supply control unit 8 as long as a structure that switches supply and shutting-off of electric power from the power supply unit 7 to the LED unit 5 is adopted. A structure in which, for example, a toggle switch that is switched on and off by manual operations by an operator such as an inspector or a service person is provided as the switching unit along the power supply line 72a is possible. In this structure, electric power is supplied in the manufacturing factory when the inspector performs an operation of turning on the switch when performing the inspection (when an instruction of an inspection process is received) and switching to shutting-off of supply of electric power is executed when the inspector performs an operation of turning off the switch after the end of the inspection (when the instruction of the inspection process is no longer received). Further, after the MFP 1 is shipped from the manufacturing factory and when the server 10 is mounted to the MFP 1, the serviceman turns the switch from off to on.

(3) In the above embodiments, an image forming device that is one example of a processing apparatus is a multi-function peripheral (MFP) 1, but the present invention should not be construed as being limited to this. The image forming device may be, for example, a printer, a copier, a facsimile device, or the like. Further, the printing unit 2b of the MFP 1 is an electrophotographic printing unit in the above embodiments, but the present invention should not be construed as being limited to this. For example, an inkjet printing unit can be used.

(4) Further, the processing apparatus should not be construed as being limited to an image forming device, and the option that is fitted to the processing apparatus and the device controlled by the option should not be construed as being limited to the combination of the server 10 and the LED unit 5. For example, a structure in which the processing apparatus is a PC, the option is a server, and the device is an input-output device for the server (a display output device, a sound output device, a touch-input device, or the like) is possible.

Further, for example, the present invention is applicable to a combination in which the processing apparatus is a television receiver, the option is a speaker having a surround effect, and the device is an amplifier driving the speaker. In this combination, the amplifier is incorporated into the television receiver in advance, and when the speaker, which is the option, is fitted to the television receiver, the speaker is driven and controlled by the amplifier.

Here, when electric power is supplied to the device (amplifier) that is mounted to the processing apparatus (television receiver) in advance, the device can perform a defined inspection process. One example of such a defined inspection process is an energization inspection for inspecting whether or not disconnection and/or short-circuiting occur or occurs in circuits in the device through detecting whether or not a lamp that is lit (or flickers) upon supply of electric power when in a normal state actually is lit (or flickers).

Further, when the option (speaker) is connected, the device (amplifier) serves as a device that performs, instead of the inspection process, a sound playback control through controlling the option (speaker).

Further, any possible combinations of the above-described embodiments and the modifications are construed as being included in the scope of the present invention.

<Supplement>

The above embodiments and modifications represent one or more aspects of the present disclosure for solving the problem described under the "Background" section, and are summarized as in the following. That is, a processing apparatus reflecting at least one aspect of the present disclosure is a processing apparatus to which an option is mountable, the processing apparatus including: a power supply unit; a device that (i) is controlled by the option mounted to the processing apparatus or controls the option and that (ii) performs a process corresponding to an inspection of whether or not the device operates normally; and a switching unit that switches on and off supply of electric power from the power supply unit to the device. In the processing apparatus, while the switching unit is receiving an instruction to initiate the process, the switching unit switches on the supply of electric power from the power supply unit to the device, while the switching unit is not receiving the instruction, the switching unit switches off the supply of electric power from the power supply unit to the device, and the device performs the process upon receiving electric power supplied from the power supply unit by the switching unit.

The processing apparatus may further include a detection unit that detects a connection between the option and the device allowing a control by the option or of the option. In the processing apparatus, while the connection is detected, the switching unit may switch on the supply of electric power from the power supply unit to the device irrespective of whether or not the instruction is received, and when the connection is established, the device may perform, instead of the process, an operation based on the control by the option or of the option.

The processing apparatus may further include: a control unit; a second device that neither is controlled by the option nor controls the option and that is controlled by the control unit; and a second power supply unit that does not supply electric power to the device and that supplies electric power to the second device.

The processing apparatus may further include: a control unit; and a second device that neither is controlled by the option nor controls the option and that is controlled by the control unit. In the processing apparatus, the power supply unit may be shared by the device and the second device, and electric power may be supplied from the power supply unit to the second device irrespective of switching on and off of the supply of electric power from the power supply unit to the device by the switching unit.

In the processing apparatus, the switching unit may include a restriction unit that performs a restriction of restricting the supply of electric power from the power supply unit to the device such that electric power that is output from the power supply unit is within a range of a power supply capacity of the power supply unit.

In the processing apparatus, the processing apparatus may be switchable to a power-saving state in which a power-saving of supplying a smaller electric power amount from the power supply unit to the second device than in a normal state is performed, and the restriction unit may function such that the restriction does not perform the restriction when the processing apparatus is in the normal state and performs the restriction when the processing apparatus is in the power-saving state.

In the processing apparatus, the second device may include a printer that performs a thermal fixing of thermally fixing an image formed on a sheet by using a fixing member heated by a heater, the power supply unit may supply a larger electric power amount to the heater during a first period than during a second period, the first period being a period in which a temperature of the fixing member is increased to a fixing temperature that is required for the thermal fixing, and the second period being a period after the first period and in which the fixing member is maintained at the fixing temperature, and the restriction unit may function such that the restriction unit does not perform the restriction during the second period and performs the restriction during the first period.

In the processing apparatus, the second device may include a printer that performs a thermal fixing of thermally fixing an image formed on a sheet by using a fixing member heated by a heater, the power supply unit may supply a larger electric power amount to the heater during a first period than during a second period, the first period being a period in which a printing operation is performed and the fixing member is maintained at a fixing temperature that is required for the thermal fixing, and the second period being a period in which the printing operation is not performed, and the restriction unit may perform such that the restriction unit does not perform the restriction during the second period and performs the restriction during the first period.

In the processing apparatus, the second device may include a scanner that performs a reading operation of irradiating a document image by using light emitted from a lamp, reading the document image, and obtaining image data, and the restriction unit may function such that the restriction unit does not perform the restriction while the reading operation by the scanner is not performed and performs the restriction while the reading operation is performed.

In the processing apparatus, the device may be controlled by the option, and when the connection is established between the option and the device, allowing the control by the option, the option may control the device such that electric power that is output from the power supply unit is in a range of a power supply capacity of the power supply unit during an operation of the second device.

In the processing apparatus, the option may acquire, from the control unit, device operation information indicating a current operation state of the second device, and based on the acquired device operation information, the option may shift an operation timing of the device, such that an operation period of the device and an operation period of the second device do not overlap with each other.

In the processing apparatus, the option may cause the device to start to operate after an end of the operation of the second device.

In the processing apparatus, while the second device is operating, the option may cause the device to operate such that an electric power amount supplied from the power supply unit to the device is smaller than while the second device is not operating.

In the processing apparatus, the device may be a display device, and while the second device is operating, the option may cause luminance of the device when performing a display to be less than while the second device is not operating or a display region of the device to be smaller than while the second device is not operating.

In the processing apparatus, the device may include: an inspection target portion; and an execution unit that causes the inspection target portion to perform the process upon receiving the supply of electric power from the power supply unit.

In the processing apparatus, the device may store a program for performing the process, and the execution unit may cause the inspection target portion to perform the process by reading out and executing the program upon receiving the supply of electric power from the power supply unit.

In the processing apparatus, the device may further include an interface connected to an inspection device instructing execution of the process, and when electric power is being supplied from the power supply unit and the execution unit receives an inspection instruction from the inspection device through the interface, the execution unit may cause the inspection target portion to perform the process based on the received inspection instruction.

In the processing apparatus, the detection unit may detect the connection by receiving, from the option to which electric power is supplied, a defined signal indicating that the option operates normally.

The processing apparatus may further include a printer that forms, on a sheet, an image based on image data. In the processing apparatus, the option may be a server that is connectable to an external terminal device through a network, acquires image data used in the printer from the external terminal device, and manages the image data.

A processing apparatus reflecting at least one aspect of the present disclosure is a processing apparatus to which an option is mountable, the processing apparatus including: a power supply unit; a device that is controlled by the option mounted to the processing apparatus or that controls the option; and a switching unit that switches on and off supply of electric power from the power supply unit to the device based on at least one of a connection state of the option and an operation state of the option.

In the processing apparatus, upon detecting that the option is operating, the switching unit may switch on the supply of electric power.

In the processing apparatus, while a connection of the option is not being detected and an instruction to initiate a process corresponding to an inspection of whether or not the device operates normally is being received, the switching unit may switch on the supply of electric power.

According to the above, inspection of whether or not a device that is incorporated in advance into a processing apparatus in a manufacturing factory operates normally is performed easily while preventing wasteful electric power consumption.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. A processing apparatus to which an option is mountable, the processing apparatus comprising:
   a power supply unit;
   a device that (i) is controlled by the option mounted to the processing apparatus or controls the option and that (ii) performs an inspection process for determining whether or not the device has no abnormality;
   a switching unit that switches on and off supply of electric power from the power supply unit to the device; and
   a detection unit that detects a connection, between the option and the device, that enables control by the option or of the option,
   wherein:
   while the switching unit is receiving an instruction to initiate the process, the switching unit switches on the supply of electric power from the power supply unit to the device, and the device performs the process upon receiving electric power supplied from the power supply unit by the switching unit,
   while the switching unit is not receiving the instruction, the switching unit switches off the supply of electric power from the power supply unit to the device,
   while the connection is detected, the switching unit switches on the supply of electric power from the power supply unit to the device irrespective of whether or not the instruction is received, and
   when the connection is established, the device performs, instead of the process, an operation based on the control by the option or of the option.

2. The processing apparatus of claim 1, further comprising:
   a control unit;
   a second device that neither is controlled by the option nor controls the option and that is controlled by the control unit; and
   a second power supply unit that does not supply electric power to the device and that supplies electric power to the second device.

3. The processing apparatus of claim 1, further comprising:
   a control unit; and
   a second device that neither is controlled by the option nor controls the option and that is controlled by the control unit,
   wherein:
   the power supply unit is shared by the device and the second device, and
   electric power is supplied from the power supply unit to the second device irrespective of switching on and off of the supply of electric power from the power supply unit to the device by the switching unit.

4. The processing apparatus of claim 3, wherein the switching unit includes a restriction unit that performs a restriction of restricting the supply of electric power from the power supply unit to the device such that electric power that is output from the power supply unit is within a range of a power supply capacity of the power supply unit.

5. The processing apparatus of claim 4, wherein:
   the processing apparatus is switchable to a power-saving state in which a power-saving of supplying a smaller electric power amount from the power supply unit to the second device than in a normal state is performed, and
   the restriction unit does not perform the restriction when the processing apparatus is in the normal state and performs the restriction when the processing apparatus is in the power-saving state.

6. The processing apparatus of claim 4, wherein:
   the second device includes a printer that performs a thermal fixing of thermally fixing an image formed on a sheet by using a fixing member heated by a heater,
   the power supply unit supplies a larger electric power amount to the heater during a first period than during a second period, the first period being a period in which a temperature of the fixing member is increased to a fixing temperature that is required for the thermal fixing, and the second period being a period after the first period and in which the fixing member is maintained at the fixing temperature, and
   the restriction unit does not perform the restriction during the second period and performs the restriction during the first period.

7. The processing apparatus of claim 4, wherein:
   the second device includes a printer that performs a thermal fixing of thermally fixing an image formed on a sheet by using a fixing member heated by a heater,
   the power supply unit supplies a larger electric power amount to the heater during a first period than during a second period, the first period being a period in which a printing operation is performed and the fixing member is maintained at a fixing temperature that is required for the thermal fixing, and the second period being a period in which the printing operation is not performed, and
   the restriction unit does not perform the restriction during the second period and performs the restriction during the first period.

8. The processing apparatus of claim 4, wherein:
   the second device includes a scanner that performs a reading operation of irradiating a document image by using light emitted from a lamp, reading the document image, and obtaining image data, and
   the restriction unit does not perform the restriction while the reading operation by the scanner is not performed and performs the restriction while the reading operation is performed.

9. The processing apparatus of claim 3, wherein:
   the device is controlled by the option, and
   when the connection is established between the option and the device, allowing the control by the option, the option controls the device such that electric power that is output from the power supply unit is in a range of a power supply capacity of the power supply unit during an operation of the second device.

10. The processing apparatus of claim 9, wherein:
    the option acquires, from the control unit, device operation information indicating a current operation state of the second device, and based on the acquired device operation information, the option shifts an operation timing of the device, such that an operation period of the device and an operation period of the second device do not overlap with each other.

11. The processing apparatus of claim 10, wherein the option causes the device to start to operate after an end of the operation of the second device.

12. The processing apparatus of claim 9, wherein while the second device is operating, the option causes the device to operate such that an electric power amount supplied from the power supply unit to the device is smaller than while the second device is not operating.

13. The processing apparatus of claim 12, wherein:
the device is a display device, and
while the second device is operating, the option causes a luminance of the device when performing a display to be less than while the second device is not operating or causes a display region of the device to be smaller than while the second device is not operating.

14. The processing apparatus of claim 1, wherein the device includes:
an inspection target portion; and
an execution unit that causes the inspection target portion to perform the process upon receiving the supply of electric power from the power supply unit.

15. The processing apparatus of claim 14, wherein:
the device stores a program for performing the process, and
the execution unit causes the inspection target portion to perform the process by reading out and executing the program upon receiving the supply of electric power from the power supply unit.

16. The processing apparatus of claim 14, wherein:
the device further includes an interface connected to an inspection device instructing execution of the process, and
when electric power is being supplied from the power supply unit and the execution unit receives an inspection instruction from the inspection device through the interface, the execution unit causes the inspection target portion to perform the process based on the received inspection instruction.

17. The processing apparatus of claim 1, wherein the detection unit detects the connection by receiving, from the option to which electric power is supplied, a defined signal indicating that the option operates normally.

18. The processing apparatus of claim 1, further comprising a printer that forms, on a sheet, an image based on image data,
wherein the option comprises a server that is connectable to an external terminal device through a network, acquires image data used in the printer from the external terminal device, and manages the image data.

19. A processing apparatus to which an option is mountable, the processing apparatus comprising:
a power supply unit;
a device that is controlled by the option mounted to the processing apparatus or that controls the option; and
a switching unit that switches on and off supply of electric power from the power supply unit to the device based on at least one of a connection state of the option and an operation state of the option,
wherein upon receiving, during a period in which a connection of the option is not detected, an instruction to initiate an inspection process to determine whether or not the device has no abnormality, the switching unit switches on the supply of electric power,
wherein upon detecting the connection of the option, the connection being a connection between the option and the device that enables a control by the option or of the option, the switching unit switches on the supply of electric power from the power supply unit to the device irrespective of whether or not the instruction is received, and
wherein when the connection is established, the device performs, instead of the process, an operation based on the control by the option or of the option.

20. The processing apparatus of claim 19, wherein the option is mounted inside a housing of the processing apparatus, and the device is mounted to an outside of the housing of the processing apparatus.

* * * * *